(12) United States Patent
Nyquist et al.

(10) Patent No.: US 8,549,997 B2
(45) Date of Patent: Oct. 8, 2013

(54) SYSTEM AND METHOD FOR COMPACTING MATERIALS IN OPEN TOP TRANSPORT CONVEYANCE

(75) Inventors: Charles Wayne Nyquist, Longwood, FL (US); Mark D. Stephen, Orlando, FL (US); Zachary Johnston Renner, Orlando, FL (US); Michael A. McCurdy, Orlando, FL (US)

(73) Assignee: Crown Products & Services, Inc., Carmel, IN (US)

( * ) Notice: Subject to any disclaimer, the term of this patent is extended or adjusted under 35 U.S.C. 154(b) by 317 days.

(21) Appl. No.: 13/055,456

(22) PCT Filed: Dec. 29, 2009

(86) PCT No.: PCT/US2009/006733
§ 371 (c)(1),
(2), (4) Date: Jan. 22, 2011

(87) PCT Pub. No.: WO2010/077348
PCT Pub. Date: Jul. 8, 2010

(65) Prior Publication Data
US 2011/0126723 A1 Jun. 2, 2011

Related U.S. Application Data

(60) Provisional application No. 61/269,503, filed on Jun. 24, 2009, provisional application No. 61/203,935, filed on Dec. 29, 2008.

(51) Int. Cl.
*B30B 15/00* (2006.01)

(52) U.S. Cl.
USPC .......... 100/100; 100/35; 100/43; 100/49; 100/65; 100/210; 100/226; 100/229 A

(58) Field of Classification Search
USPC ........ 100/35, 43, 49, 65, 100, 210, 226, 229 A
See application file for complete search history.

(56) References Cited

U.S. PATENT DOCUMENTS 2,717,703 A 9/1955 Kull et al.
3,357,576 A 12/1967 Strombeck et al.
(Continued)

FOREIGN PATENT DOCUMENTS

CN 1511775 A 7/2004
CN 201362515 12/2009
(Continued)

OTHER PUBLICATIONS

Espacenet English language abstract for JP 10258920 A published Sep. 29, 1998.
(Continued)

*Primary Examiner* — Dana Ross
*Assistant Examiner* — Onekki Jolly
(74) *Attorney, Agent, or Firm* — Reinhart Boerner Van Deuren s.c.

(57) ABSTRACT

A compacting system compacts particulate matter in open-top railroad gondola cars rolling on rails. The compacting system comprises a compacting station adjacent the rails and a scanning system that scans the gondola cars as they move along the rails toward the compacting station. The scanning system transmits data of the gondola car to an electronic control system. The compacting station has at least one compaction member, e.g., a plate structure or a roller, configured to contact an upper surface of the particulate matter in the gondola cars. The electronic control system controls the compacting station so that the compaction member engages with and applies force to the upper surface of the particulate matter in the gondola car so as to compress the particulate matter in the gondola. A method for compacting particulate matter in a gondola car is also shown.

17 Claims, 21 Drawing Sheets

(56) References Cited

U.S. PATENT DOCUMENTS

| | | | |
|---|---|---|---|
| 3,774,785 | A | 11/1973 | Gasseling |
| 3,941,047 | A * | 3/1976 | Orlando et al. ............... 100/100 |
| 3,961,752 | A | 6/1976 | Doeksen |
| 4,068,768 | A | 1/1978 | Hicks, Jr. |
| 4,169,170 | A | 9/1979 | Doeksen |
| 4,307,989 | A | 12/1981 | Dumbaugh |
| 4,411,578 | A | 10/1983 | Morrow, Jr. |
| 4,625,654 | A | 12/1986 | Kuss et al. |
| 4,844,683 | A | 7/1989 | Compton |
| 5,033,932 | A | 7/1991 | Compton |
| 5,140,911 | A | 8/1992 | Holland |
| 5,192,337 | A | 3/1993 | Wajer et al. |
| 5,193,453 | A * | 3/1993 | Lundy ........................... 100/100 |
| 5,350,596 | A * | 9/1994 | Walker, Jr. .................... 427/154 |
| 5,352,297 | A * | 10/1994 | Peters ............................ 134/15 |
| 5,441,566 | A * | 8/1995 | Vaughan ........................ 118/300 |
| 5,488,911 | A * | 2/1996 | Riggin .......................... 105/240 |
| 5,735,195 | A * | 4/1998 | Hewitt et al. ................... 100/65 |
| 5,779,427 | A | 7/1998 | Heffinger |
| 6,021,712 | A * | 2/2000 | Harrop ............................ 100/43 |
| 6,312,206 | B1 | 11/2001 | Pylate et al. |
| 6,739,535 | B2 | 5/2004 | LaBarbera |
| 6,782,809 | B2 * | 8/2004 | Bodecker ......................... 100/65 |
| 6,835,041 | B1 | 12/2004 | Albert |
| 7,085,625 | B2 * | 8/2006 | Timothy et al. ............... 700/275 |
| 7,293,640 | B1 | 11/2007 | Aulick |
| 2006/0044110 | A1 * | 3/2006 | Napolitano ................... 340/5.92 |
| 2007/0251400 | A1 * | 11/2007 | Glass et al. ............. 100/269.01 |
| 2007/0289861 | A1 * | 12/2007 | Barkdoll et al. ................... 201/8 |
| 2008/0236439 | A1 | 10/2008 | Low et al. |
| 2008/0298905 | A1 * | 12/2008 | Lindenbaum .............. 405/302.6 |
| 2008/0304065 | A1 * | 12/2008 | Hesser et al. ................. 356/400 |
| 2009/0171500 | A1 | 7/2009 | Matsumoto et al. |
| 2009/0260539 | A1 | 10/2009 | Poncet |

FOREIGN PATENT DOCUMENTS

| | | |
|---|---|---|
| EP | 1864924 A1 | 12/2007 |
| JP | 58069610 A | 4/1983 |
| JP | 8099727 A | 4/1996 |
| JP | 8103681 A | 4/1996 |
| JP | 10087046 A | 4/1998 |
| JP | 10258920 A | 9/1998 |
| KR | 20060133378 A | 12/2006 |
| KR | 200800114584 A | 2/2008 |
| KR | 20110028007 A | 3/2011 |
| SU | 1190069 A | 11/1985 |
| WO | WO2007132072 A1 | 11/2007 |

OTHER PUBLICATIONS

Espacenet English language abstract for JP 58069610 A published Apr. 25, 1983.
Espacenet English language abstract for KR 20110028007 A published Mar. 17, 2011.
Espacenet English language abstract for JP 10087046 A published Apr. 7, 1998.
English language abstract for SU 1190069 A published Nov. 7, 1985.
Espacenet English language abstract for CN 1511775 A published Jul. 14, 2004.
Espacenet English language abstract for WO 2007 132072 A1 published Nov. 22, 2007.
Espacenet English language abstract for KR 20080014584 A published Feb. 14, 2008.
Espacenet English language abstract for KR 20060133378 A published Dec. 26, 2006.
Espacenet English language abstract for JP 8099727 A published Apr. 16, 1996.
Patent Abstracts of Japan English language abstract for JP 8103681 A published Apr. 23, 1996.

* cited by examiner

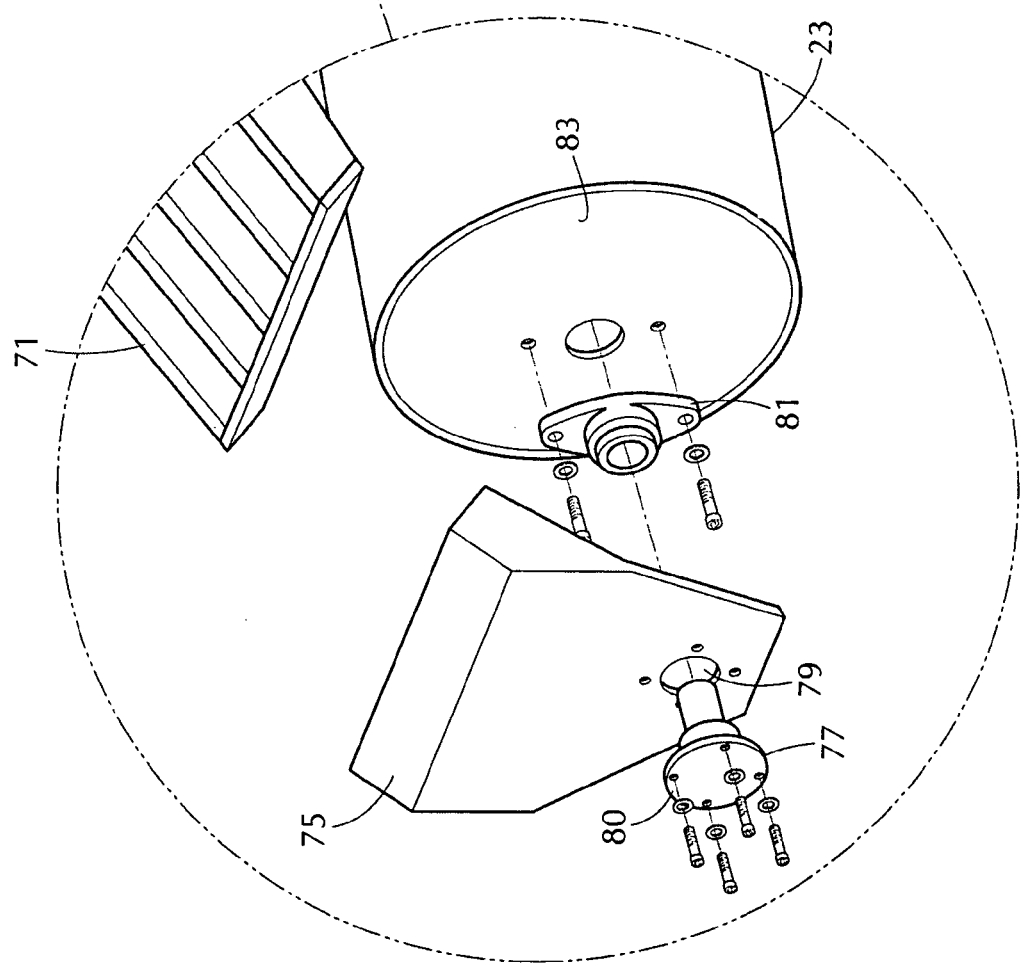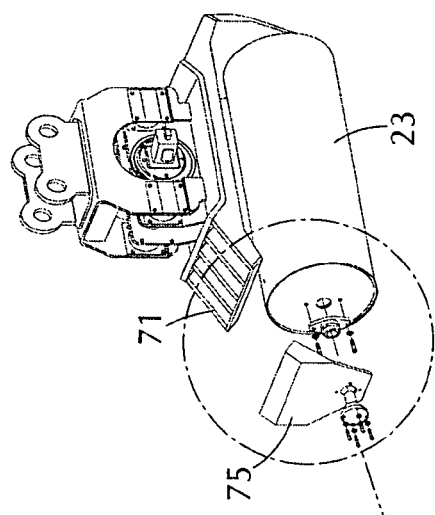
FIG. 10

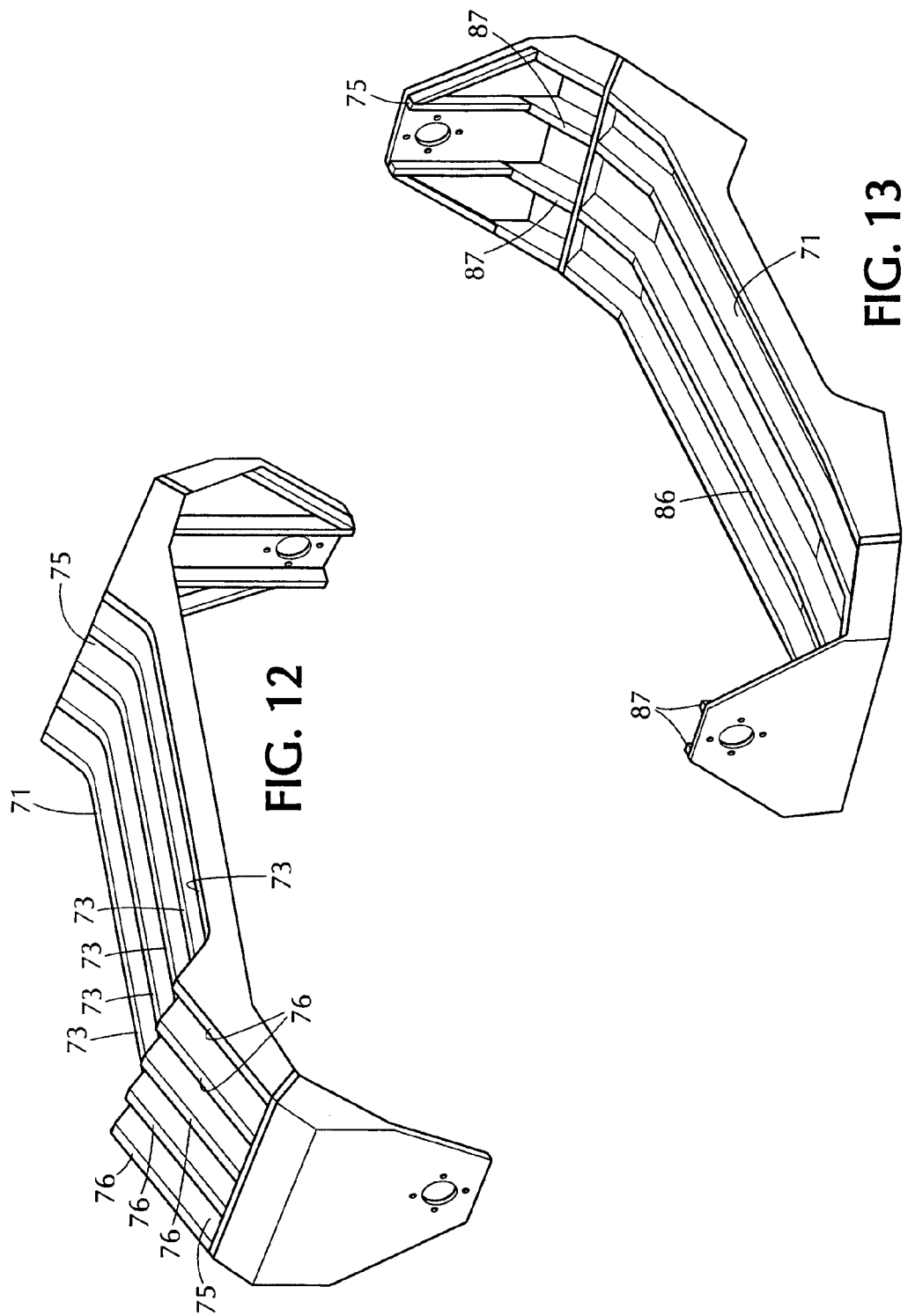

SYSTEM AND METHOD FOR COMPACTING MATERIALS IN OPEN TOP TRANSPORT CONVEYANCE

RELATED APPLICATIONS

This application claims the benefit of U.S. provisional applications Ser. No. 61/269,503 filed Jun. 24, 2009 and Ser. No. 61/203,935 filed Dec. 29, 2008.

FIELD OF THE INVENTION

This invention relates to the field of transport of particulate materials such as coal or gravel, and more particularly, to the processes and methods of transporting particle materials such as coal in open-top gondola railway cars.

BACKGROUND OF THE INVENTION

Coal and other material cargo made up of discrete parts and small particulate matter, such as iron or other metal ores, earth, gravel or sand, and other products are often transported in open top gondola cars coupled in an extended train of cars and pulled by a locomotive. Tippling systems or hopper chutes fill the gondola cars with the material being transported, and when they reach their destination systems unload the gondola cars, usually by rotating the cars to dump the material.

A problem that is encountered in transport of materials such as coal or ore that are made up of particles in the form of chunks of rock or smaller particles that break off during the mining of this material or extraction by other means, is that the gondola cars, when in movement, have a flow of air passing over them, sometimes at speeds of 50 or 60 mph or more. This produces wind on the top of the gondola cars that disturbs smaller particles in the discrete pieces of material being transported. The force of the wind is easily sufficient to lift smaller or even larger particles in the cargo load so they are carried out of the gondola car.

The particles that have been lifted out of the car fall to the ground, and this results in a large amount of material being left by the side of the railway tracks, especially near the initial loading area. In transport of coal, it has been determined that hundreds of pounds of coal may be lost every time a single gondola car is transported. This loss, multiplied by as many as one hundred gondola cars in a train, and that multiplied by many trains being used per day, means that a very large amount of material is simply lost in transport.

Some systems have been proposed for covering or enclosing the gondola cars, notably systems in which a lid is provided over the top of the gondola car. However, this complicates the operation when the gondola car is loaded, because usually a human operator must access the lid and open it when the gondola car is being loaded and then, after loading, the human operator must close this gondola car lid. This involves a substantial amount of labor which is undesirable, especially when it is considered how many gondola cars are normally involved in a train that is used to transport the particulate materials being discussed.

Similarly, use of another covering, such as a tarp or fabric covering over the top of the coal or other particulate material, requires a human operator to apply it, again complicating the loading operation.

SUMMARY OF THE INVENTION

It is therefore the object of the invention to provide a system and method for efficiently minimizing or reducing the loss of particulate material in open-top gondola cars.

According to an aspect of the invention, a compacting system compacts particulate matter in open-top railroad gondola cars rolling on rails. The compacting system comprises a compacting station adjacent the rails and a scanning system that scans each of the gondola cars as they move along the rails toward the compacting station. The scanning system transmits data of each of the gondola cars to an electronic control system. The compacting station has at least one compaction member, e.g., a plate structure or a roller, configured to contact an upper surface of the particulate matter in the gondola cars. The electronic control system controls the compacting station so that the compaction member engages with and applies force to the upper surface of the particulate matter in the gondola car so as to compress the particulate matter in the gondola car.

According to an aspect of the invention, a method for compacting particulate matter in a railroad gondola car comprises scanning the gondola car and generating therefrom data corresponding to a dimension of the gondola car or identification from which dimensions of the car may be determined, receiving the data from the scanning station; and controlling operation of a compacting station using the data from the scanning station. The compactor station is controlled to perform the steps of elevating a compacting member at the compacting station to a height above a top height of a front wall of the gondola car while the front wall passes under it, lowering the compacting member so as to contact an upper surface of the particulate matter and so as to apply a compacting force to the particulate matter as the open interior of the gondola car passes below the compacting member, and elevating the compacting member to a height above a top height of a rear wall of the gondola car while the rear wall passes below it.

According to another aspect of the invention, a compaction station comprises a support structure supporting a compaction member extending laterally across and above a pair of rails configured to carry railcars. The compaction member is supported for reciprocal vertical movement between an upper position and a lower position. The upper position is such that a front wall and a back wall of a gondola car can pass on the rails under the compaction member. The lower position is such that the compaction member in the lower position engages and applies a downward compacting force to a surface of particulate matter in a filled gondola car with an open top cargo space when the gondola car cargo space is below the compaction member. The compaction member is of a lateral dimension small enough that the compaction member fits into the cargo space of the gondola.

According to another aspect of the invention, a system is provided for use in a railroad yard through which a train of open-top gondola cars can be pulled on a set of railroad tracks. The railroad tracks extend under a tippling or loading device that fills each of the gondola cars with the coal or other particulate material as it passes under it.

After passing under the filling device, the railroad cars proceed until they reach a first scanning station of the system, where the railway car is scanned to determine its dimensions. This may be done by detecting the presence of the railroad car by a laser beam system crossing the railroad tracks, and then activating a scanner that interrogates an RFID tag on the railroad car. Such RFID tags are required by industry standards, and these tags contain or link to data defining the dimensions of the gondola car associated with the tag, and other aspects of its operation.

The scanned RFID data is then transmitted to a computer system that controls a subsequent compaction station of the system. The compaction station is displaced further forward of the railroad car along the railroad tracks. The railroad cars each reach this compaction station, which also uses a laser system projecting a laser across the railroad tracks to detect the presence and speed of the railway car as it moves by. The compaction system includes a compaction apparatus is movably supported above the railway cars for up and down vertical movement by a hydraulic system that can raise or lower the compaction system to a specified or predetermined height.

In normal operation, the railroad cars arrive at the compaction station and are detected by the laser device and then the computer system which controls the system causes the compaction device to elevate to a point to clear the front of the gondola car, and then to lower to the point of contacting the particulate material.

According to one embodiment, the compaction system has a vibrating roller of the type commonly used for sealing or compacting roadways. This compacting roller engages the particulate material in the gondola car and presses down on it with a substantial force that is sufficient to compact the material so that it does not blow out of the gondola car in a large amount.

According to another embodiment, a plurality of compaction stations are provided in the compaction system. Each compaction station includes a generally planar portion that is movable or pivotal generally vertically so the station may be moved away from the particulate material or downward to engage it and groom the surface of the material in the railroad car. The stations each has a vibration device that imparts vibration to press the particulate lading down and compact it. The first of the compaction stations compacts the particulate down to a first height, and the second station compacts it to a second height lower than the first. Preferably, a third station compacts the particulate even further down. After the compaction, the particulate should be generally at the level of the top chords of the sides of the railway car.

A method of compacting particular materials is also here disclosed in which coal is loaded into a gondola car, and then, as the gondola car is in movement, the car is passed under a vertically movable roller system that presses down on an upper surface of the coal and compacts it in the gondola car, or under one or more vibrating plate compaction stations that compact the particulate in the car.

An alternative application is to have a manually operated system, thereby reducing the cost and complexity of the scanning and/or automation.

Other objects and advantages of the invention will become apparent from the specification.

BRIEF DESCRIPTION OF THE DRAWINGS

FIG. 10 is a detailed view showing the connection showing the roller to the supports on which it is allowed to rotate.

FIG. 12 is a top view of a support structure which supports the roller.

FIG. 13 is a bottom perspective view of the parts shown in FIG. 12.

DETAILED DESCRIPTION

Figure 1:
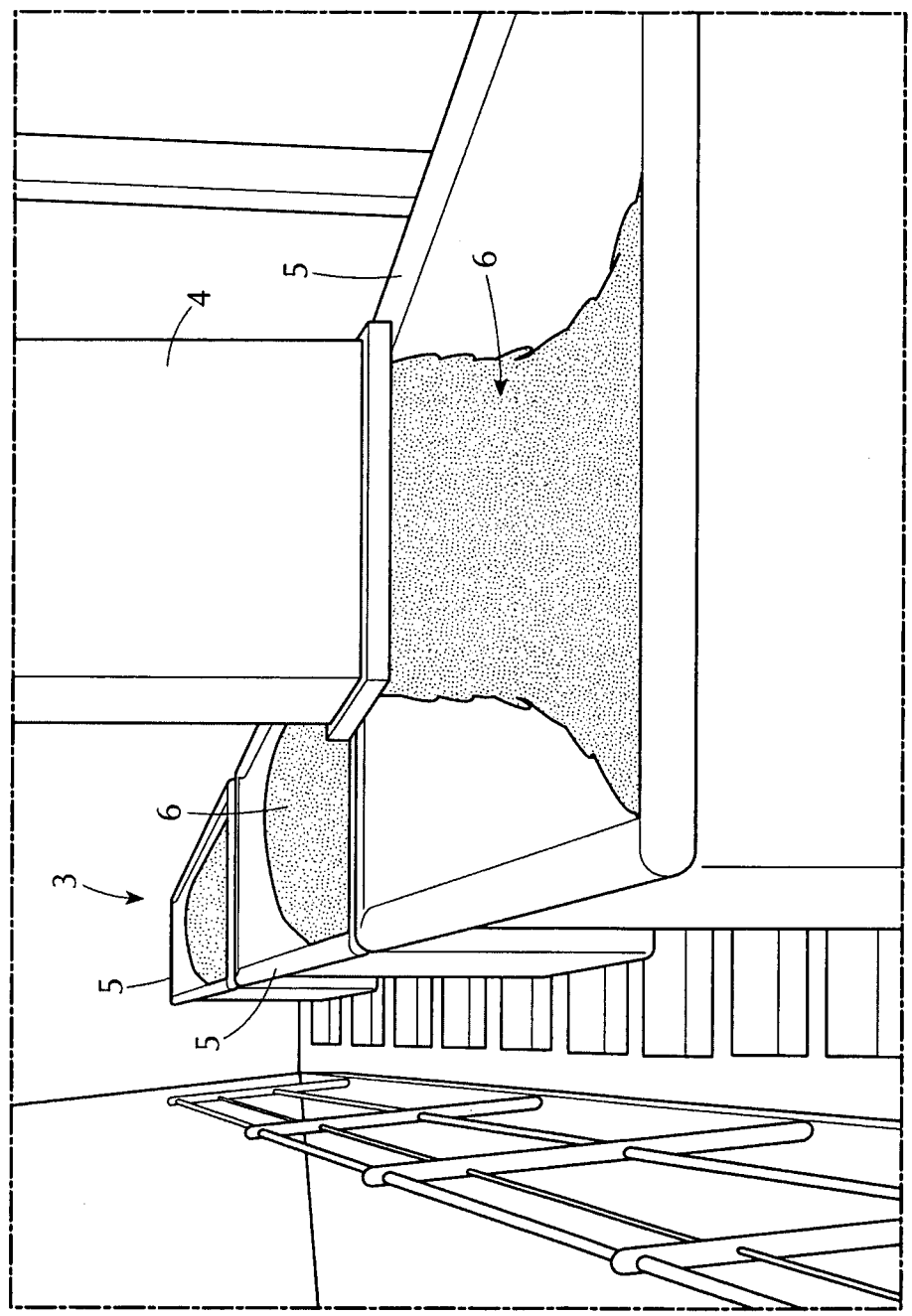
FIG. 1 shows a coal chute loading system loading gondola cars being pulled in series through a coal yard.

As best seen in FIG. 1, a train 3 is made up of a series of serially connected open-top gondola cars 5, which are drawn at a relatively slow speed along a pair of railroad tracks by a locomotive (not shown). As the cars are drawn at a fairly slow speed through a coal or other particulate material loading area, a tippler or loading chute 4 drops the particulate material 6 into the interior of the open-top gondola cars 5 and fills each to the top of the gondola, or to the top of its operating cargo height. A standard prior art filling system may be used, or the filling system may be modified to optimize the deposition of material in the gondola car for compaction and grooming. Particularly preferred to secure benefits of the present invention is coal having a particle size in the range of 1 to 3.5 inches in diameter, more preferably in the range of 1.5 to 2.0 inches in diameter or 2.0 to 3.0 inches in diameter.

Figure 2:
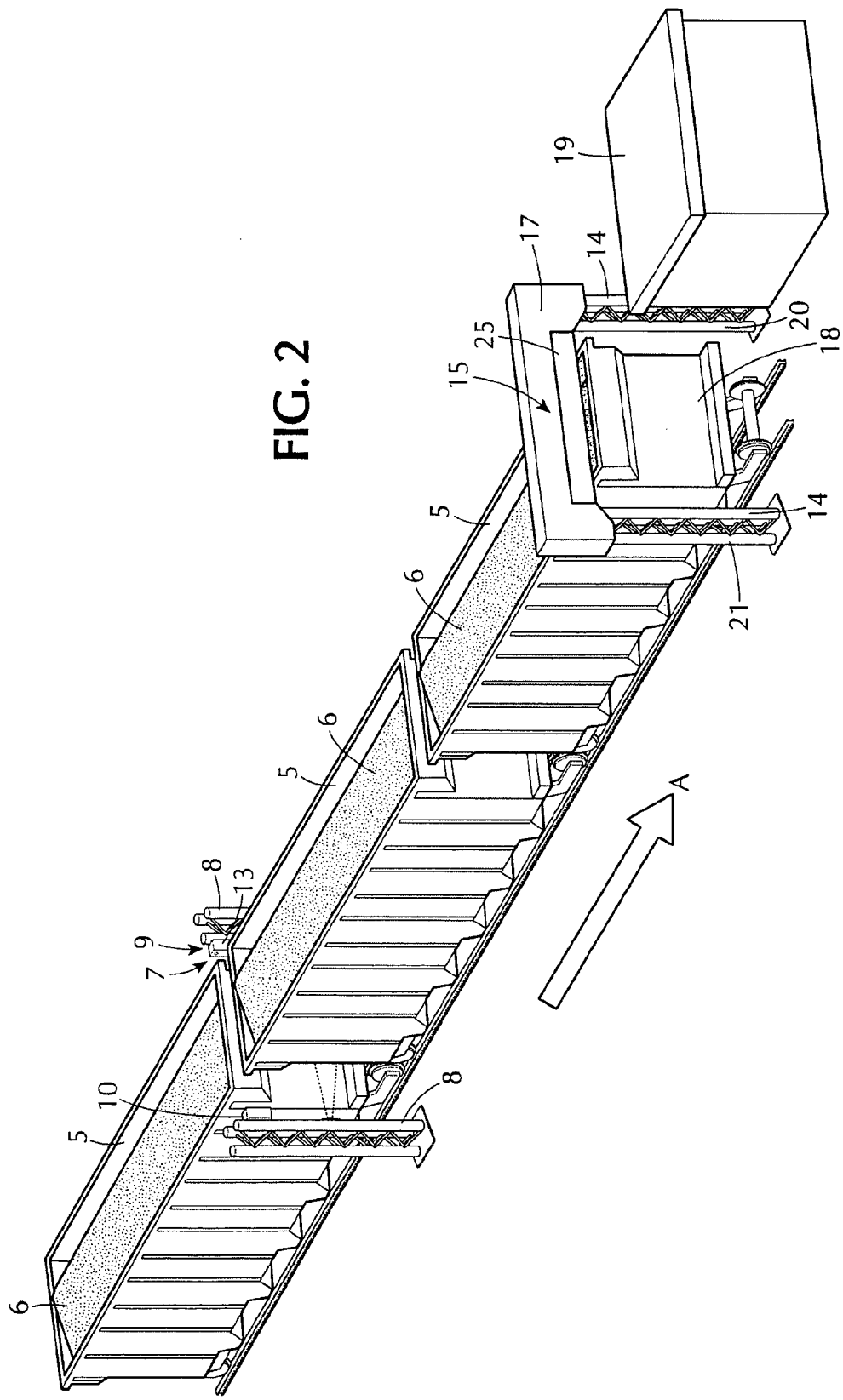
FIG. 2 is a schematic illustration showing the subsequent processing of the gondola cars through a reader station and a compaction station.

As best seen in FIG. 2, after filling the gondola car 5, the cars proceed to a coal or other particulate material compaction system. The cars 5 of the train 3 pass along the rails in a forward direction indicated at A.

Figure 3:
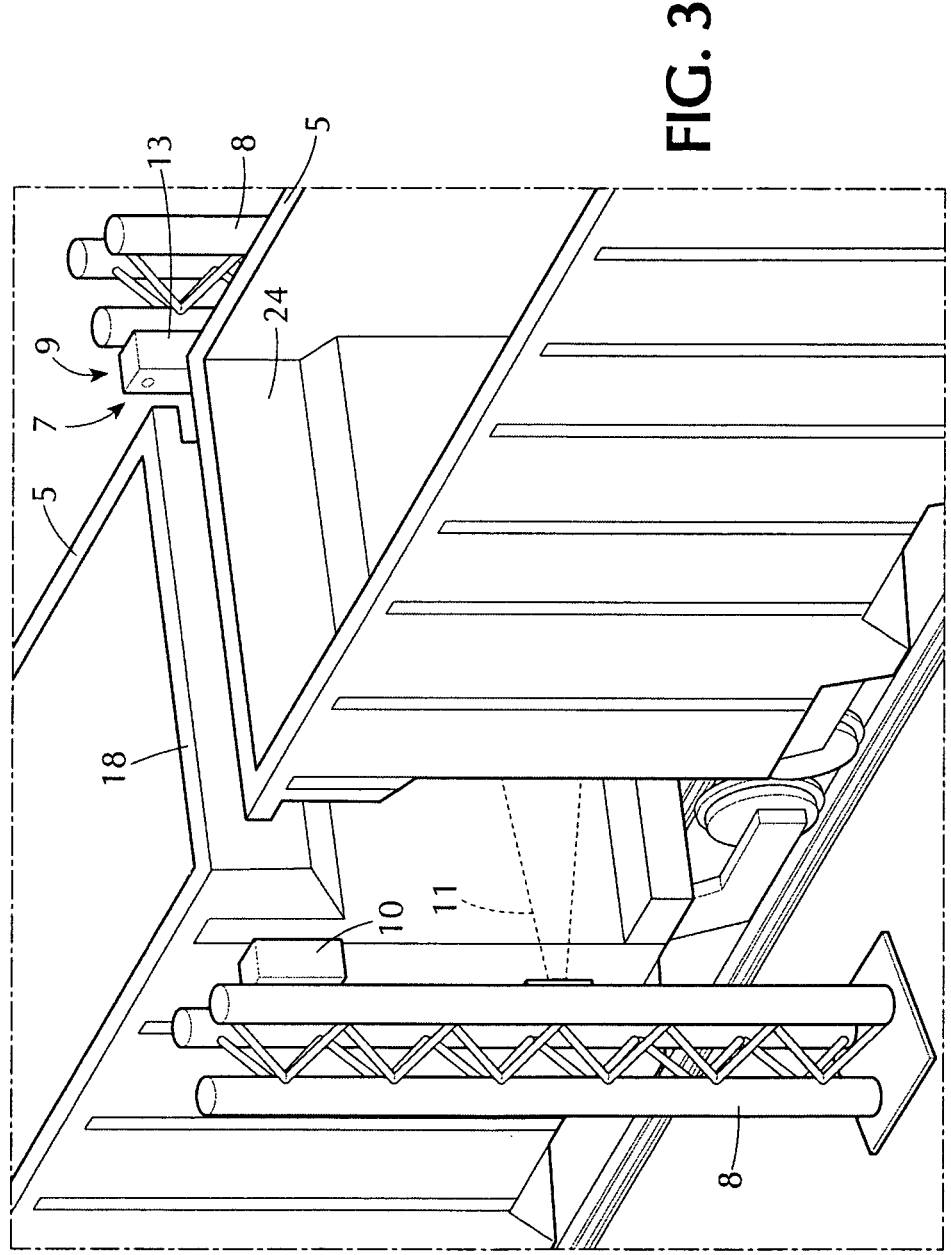
FIG. 3 is a schematic detail view showing the scanning station.

Referring to FIG. 3, at one point along the rails, the cars pass through a scanning station 7. The scanning station includes two laterally spaced pillars 8, one on each side of the rails. A laser sensor generally indicated at 9 comprises a laser transmitter 10 that is supported on one pillar and projects a laser beam across the rails to laser receiver and transmitter 13.

This laser receiver 13 detects when a space has appeared between the cars 5, indicating that a new car is moving into the scanning area of the pillars 8. Laser position sensor 13 then causes RFID reader 11 to scan an RFID tag incorporated into the associated railroad car 5 that is at that point in time passing laser sensor 9. This laser RFID tag contains data that is transmitted by the laser receiver and transmitter to a computer system associated with the compaction and profiling system 15, which has a computer system that can receive the data. The RFID data contains industry-standardized data about the railroad car indicating a number of pre-established standard pieces of information relevant in the industry, such as the dimensions of the car and other aspects of its loading, as well as other provenance data for the railroad car 5.

The car 5 after passing the scanner station 7 proceeds at a slow rate (about 1 mph) towards the compaction station 15, which is a profiling and optionally a liquid spray tower that conditions the top surface of the coal or particulate matter 6 of the gondola car 5 so as to limit the loss of smaller particles during transport of the gondola car 5.

As the gondola cars reach the profiling or compaction station 15, the speed of the car and its height are detected by a system, e.g., a laser system as is present in scanning station 7. Hydraulic systems associated with laterally spaced pillars 14 then move the upper portion 17 of the compaction station 15 over the front wall 18 of the gondola car 5 and then down into the gondola car interior after the wall 18 passes, so that the compaction unit 17 compresses the surface of the particulate material in gondola car 5. Optionally, a spray of liquid may be applied as well, with the liquid supplied from a chemical tank (not shown) in adjacent housing 19. Housing 19 also houses the computer system that controls the overall operation of the system, including the positioning of the compaction top unit or palette 17.

Figure 4:
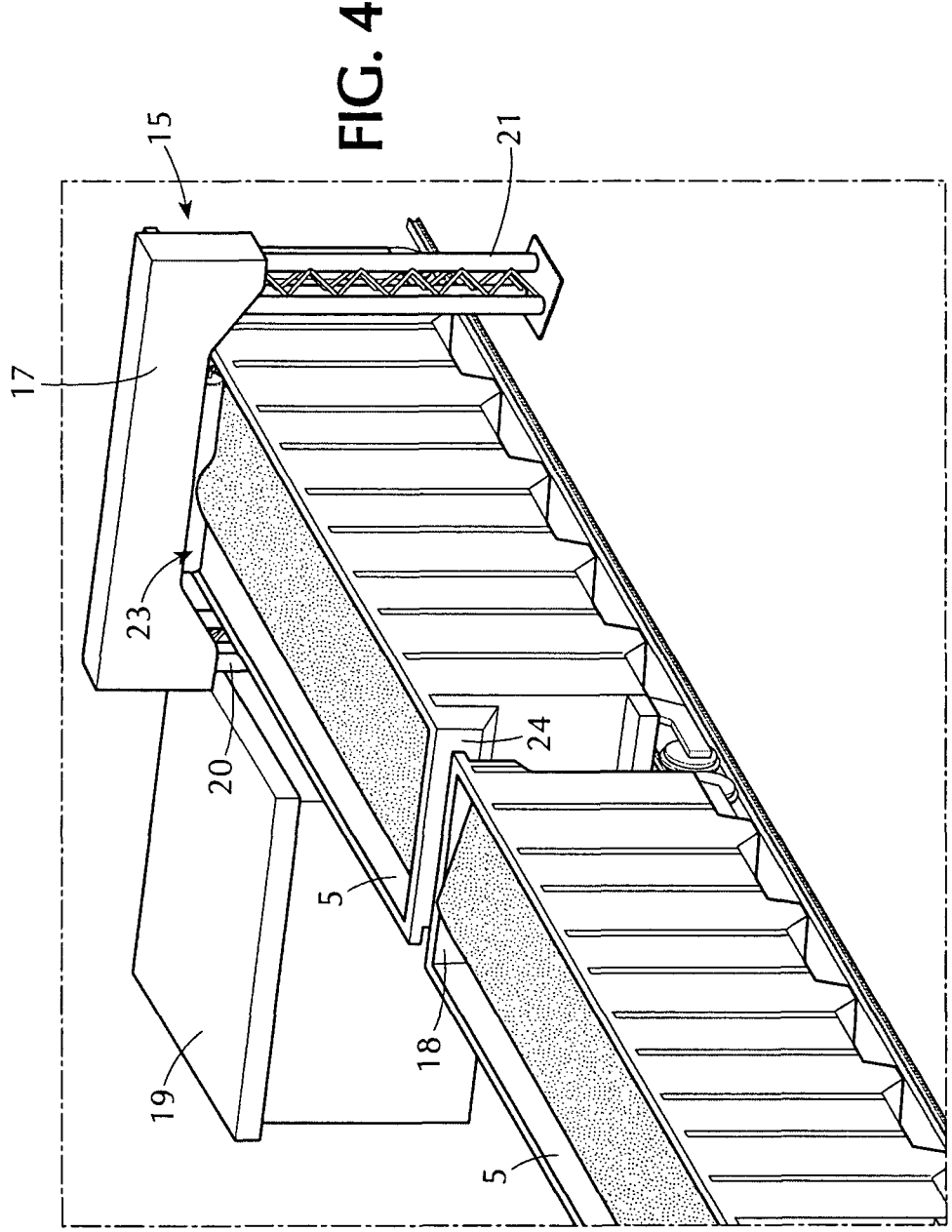
FIG. 4 is a perspective view from the rear of the railway cars showing the compaction station.

Referring to FIG. 4, the compaction system top unit 17 is supported on the left and right pillars 20 and 21. Compaction unit 17 has a frame structure supported on the hydraulic system that supports a horizontally positioned, laterally extending roller 23 to rotate on the frame. The roller 23 is a rotating vibrating roller used commonly for sealing and compressing surfaces of roads. This roller 23 may be adapted from the road-surfacing roller product sold under the model name VRS 84 by the BRADCO Company located in Avenel, N.J. as an example. This is a 24 inch diameter roller which is 84 inches wide and provides 10,000 pounds of impulse force at 2600 vibrations per minute. The vibration is created by an attachment with an offset weight which is driven by a rotating motor or hydraulic pump driven by the pressurized hydraulic fluid. The vibration device is fixedly secured to the frame supporting the roller 23, and the vibration is transmitted through the rigid frame to the roller 23 to create vibrations in the roller as it rolls over the coal. Alternatively or in addition, vibration may be provided by an off-center rotating mechanism inside the cylindrical body of the roller 23 that is driven with the roller but at a much higher rpm. One vibration device suitable for use with the invention is sold by Allied Construction Products, LLC as the model 2300 "HO-PAC" vibratory compactor.

Figure 6:
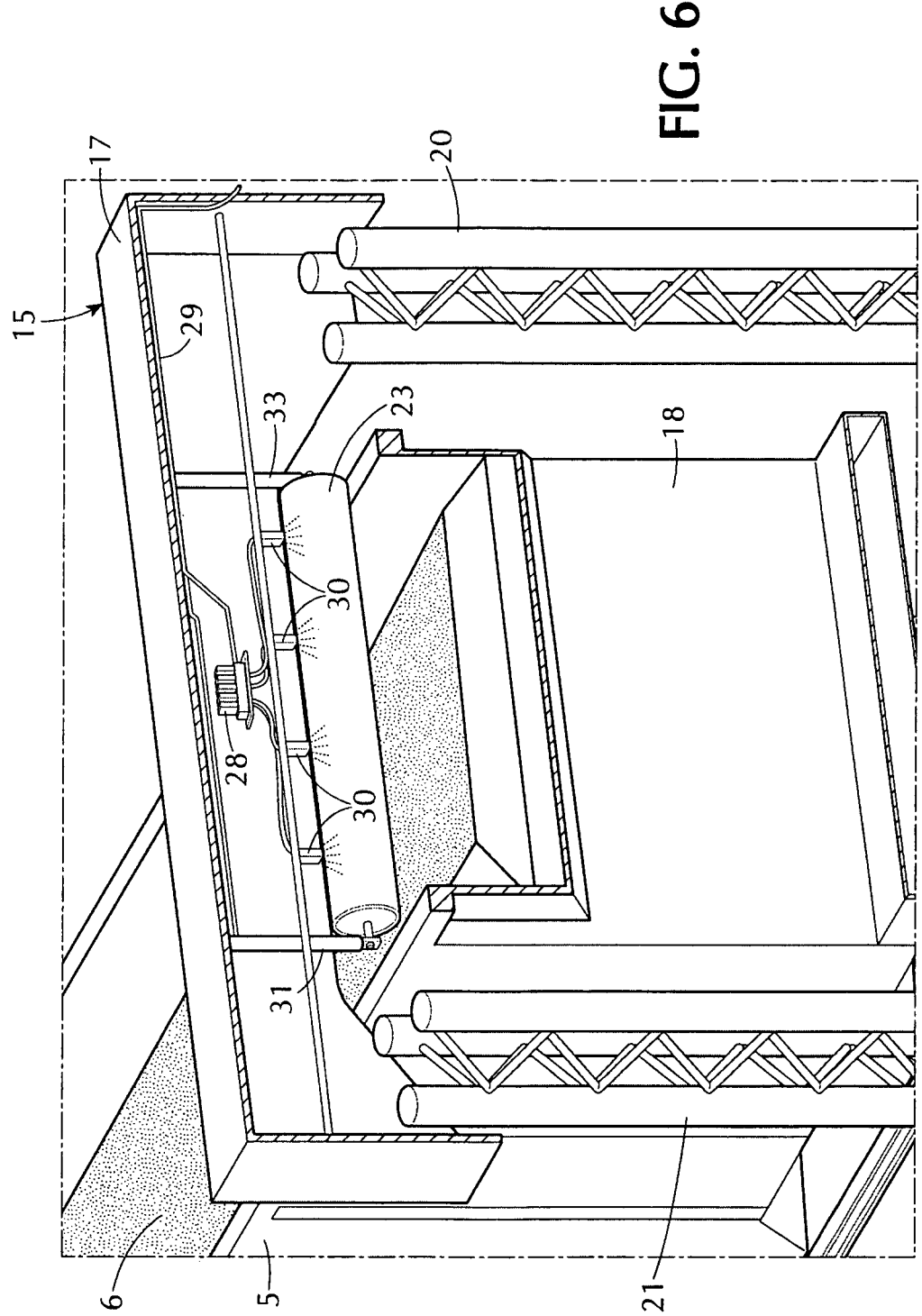
FIG. 6 is a partially cutaway view of FIG. 4 showing the internal position of the roller in the compaction system.

The roller 23 is supported on hydraulic rams 31 and 33, seen in FIG. 6, so as to be movable up and down by the hydraulics controlled by the computer system that operates the overall compaction or process. This hydraulic system is configured such that in the default "off" state the roller 23 is elevated up close to top unit 17, so that the roller 23 is high enough to clear the top of the highest permitted clearance profile of any railroad car, so that any railroad car can pass through it with the roller 23 in the up position. Therefore, if the system is turned off or loses power, the hydraulics lift the unit 17, and there is no possibility of the head 17 striking a car being driven through the compacting station 15.

In compacting operation, a sensor at the compaction station 15, such as the laser position sensor like that of the scanning station 7, detects arrival of a car at the compacting station 15. Responsive to this detection, the computer system causes the hydraulic rams 31 and 33 in the head 17 to elevate the roller 23 above the front wall 18 of the gondola car. The height of elevation may be the full height possible, but is preferably determined by the computer control system based on the data received from the scan of the car's RFID tag, which provides height dimension data for front wall 18 of the car 5. After the railway car 5 moves forward enough so that front wall 18 passes forward of the roller 23, roller 23 is dropped down to the front of the particulate material, which is usually humped in the middle of the car with a sloping surface sloping downward and forward. The roller 23 engages this forward sloping surface part of the particulate material load, and then rolls along the top of the coal or particulate material, compacting it and grooming the surface so that its top surface is flat or close to flat, corresponding to the shape of the cylindrical roller 23. The car 5 moves forward, and the roller 23 compacts the material 6, rolling toward the rear wall 24 of the car 5. When the computer system determines that the car, based on its length from the RFID data and the car's detected speed, or based on some other detection system, is approaching the point where rear wall 24 is within a predetermined threshold limit distance from the roller 23, the system causes the hydraulics to elevate the roller 23 so that it clears the rear wall 24 as the rear wall 23 passes underneath it. The roller 23 then remains elevated until it clears the front wall 18 of the next car 5.

In one embodiment, the roller 23 is 24 inches in diameter and 84 inches wide. The total surface area of the roller is 6333 in$^2$ of which about 25% is in contact with the coal, i.e., about 1583 in$^2$. The weight of the roller 23 itself is 2250 pounds. The force that is applied downward on the roller 23 to accomplish appropriate compaction is in the range of 2000-30,000 pounds impulse force, and preferably approximately 10,000 pounds (about 9,800 pounds) impulse force, resulting in a total downward force from the roller 23 onto the coal of about 12,300 pounds. The impulse force is essentially the maximum downward force onto the roller from the hydraulic systems combined with the maximum force from the vibration at the maximum force for its vibration cycle. The pressure on the coal from the roller is in the range of 2 to 50 pounds per square inch (psi), and preferably in range of 7 to 19 pounds per square inch, and most preferably about 8 psi (viz. 12,300 pounds/1583 in$^2$=7.77 psi). Maximum psi should not exceed 50 psi.

This force may be constant or may vary over the length of the car 5 as it passes under roller 23. Where the force is variable, palette 17 presses downward on the roller 23 at the greatest force toward the front of the gondola car, and the force is eased as the roller 23 passes towards the rear of the car, so as to form a more aerodynamic profile and avoid spillage.

Figure 5:
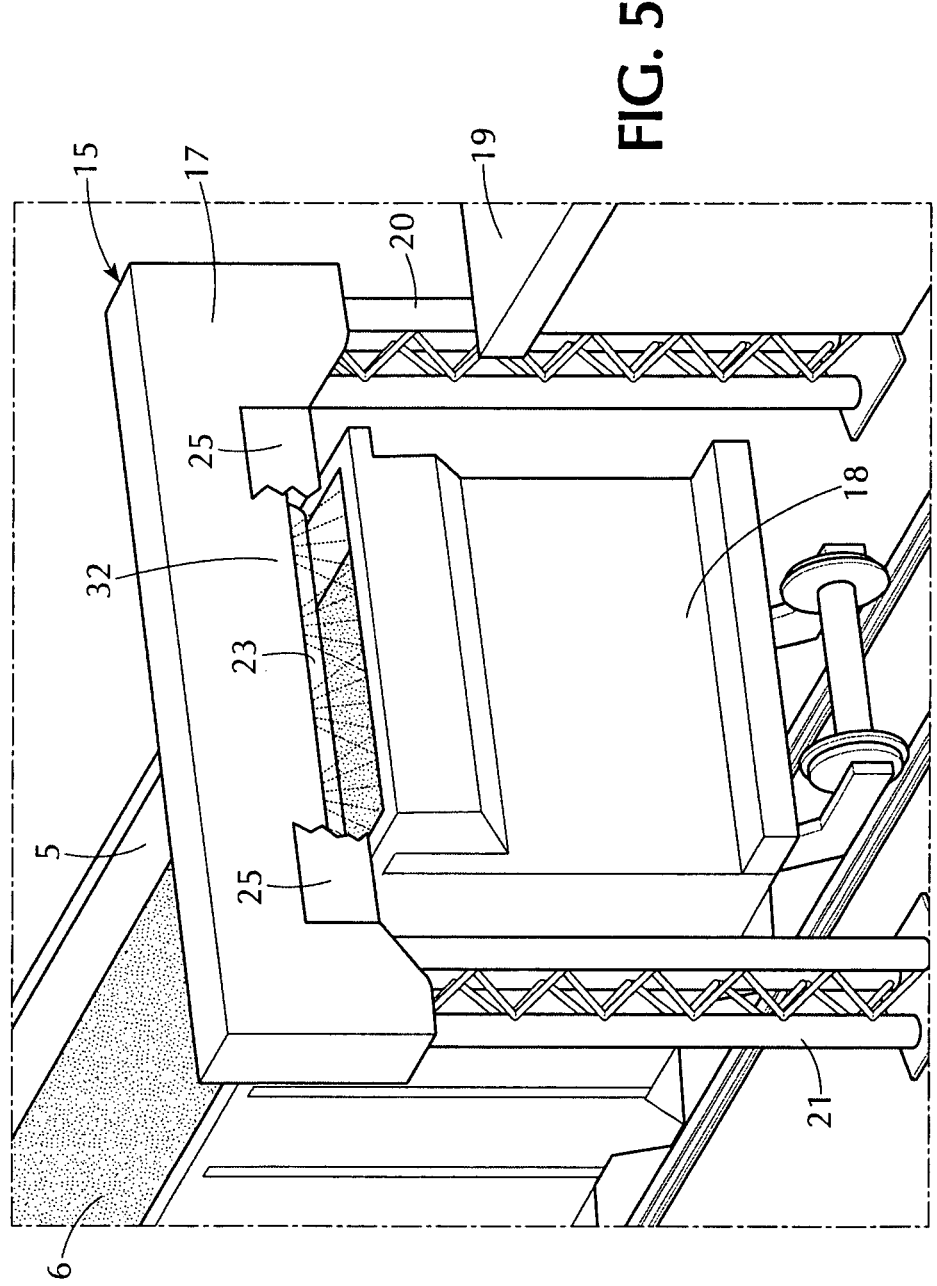
FIG. 5 shows a view from the forward position of the train of the compaction station.

An additional optional feature is the spraying of a surfactant or topping agent on the coal, although the primary design does not include the liquid surfactant option. Referring to FIGS. 5 and 6, palette 17 may include a nozzle system that sprays a surfactant or topping agent onto the upper surface of the particulate material 6 in the gondola 5. This topping agent also aids in preventing the fly-away of especially very small particles of the material being transported in the cars 5. One agent suitable for use as the topping agent fluid is the product sold under the name DT50 by Zinkan Enterprises, Inc. 1919 Case Parkway North, Twinsburg, Ohio 44087, which is an aqueous polymer dispersion used for coal applications.

The topping agent is applied by an array of nozzles 30 connected with a manifold 28 that distributes the topping agent fluid provided from a fluid supply in the housing 19. To ensure that the spray of the liquid is efficiently provided and/or to reduce wind effects, the nozzles 30 are situated behind a fairing 32 of the top unit 17 and further, a wind block 25 of rubber material is provided. This wind block 25, seen cut away in FIG. 5, extends low enough to pass close to the surface of the gondola car as it passes under the top unit palette 17.

In addition to the supply of topping agent or surfactant, hydraulic line 29 is provided, bringing hydraulic fluid from housing 19 to hydraulic cylinders 31, 33, that impel the roller 23 to move downward engaging the compacted material.

Figure 7:
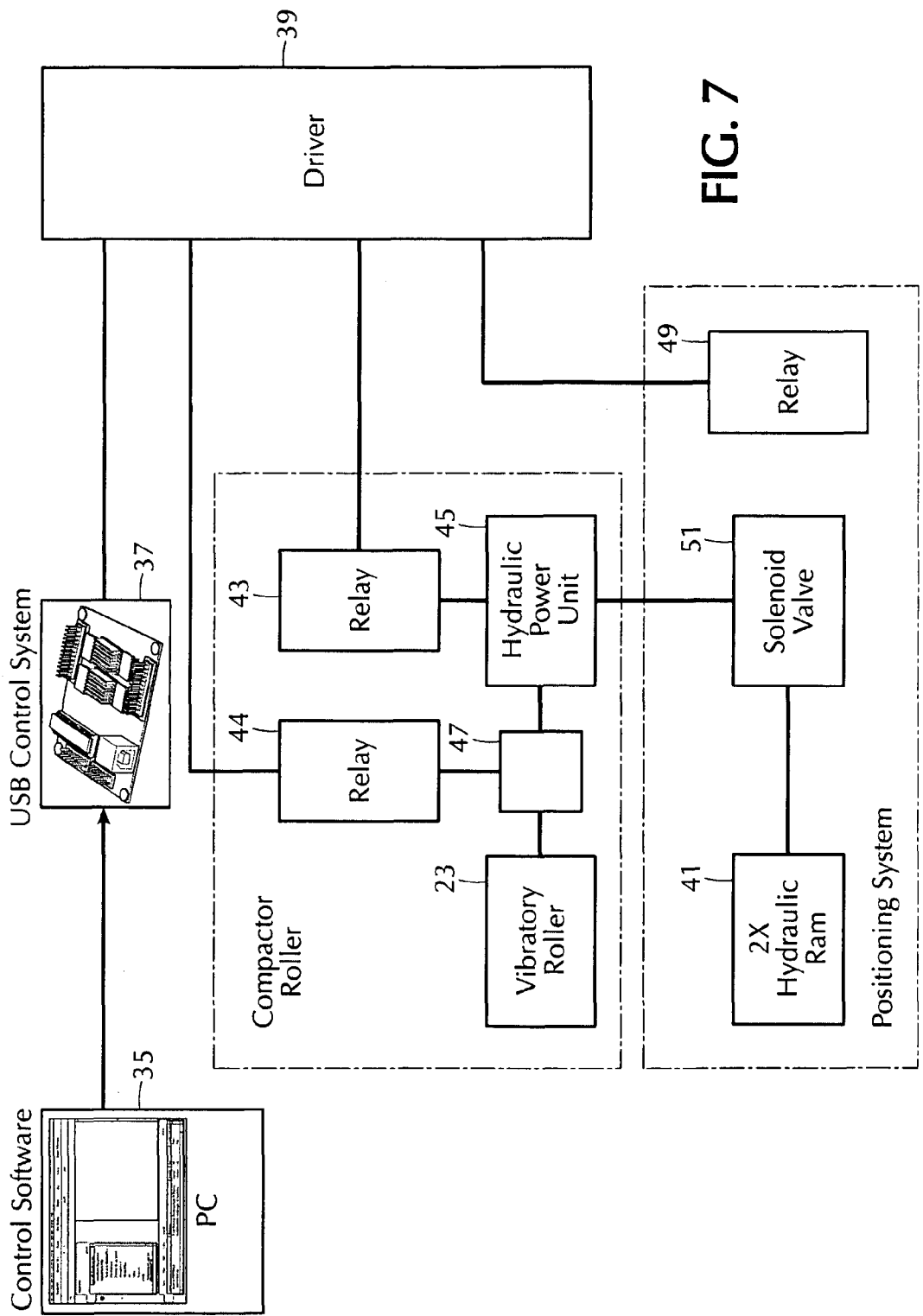
FIG. 7 is a schematic illustration of the operation of the computer with the compaction system.

A computerized control system is shown schematically in FIG. 7. A PC-based computer system 35 in the housing 19 or elsewhere in communication with the compaction unit 15 transmits electronic control commands via a USB control system 37 to a driver device 39. This driver device 39 controls the operation of both the compactor roller 23 and the positioning system of two hydraulic rams located at 41, these being the hydraulic rams 31 and 33 of FIG. 6. At system start, the driver 39 switches on a first relay 43 that starts the powered operation of a hydraulic power unit 45. Hydraulic power unit supplies pressurized hydraulic fluid that drives both the vibratory roller 23 and the hydraulic ram system 41 (rams 31 and 33). Driver 39 also controls another relay 44 that opens valve 47 so as to permit flow of hydraulic fluid to the vibratory roller system 23, driving it and providing the energy needed to vibrate. The vibration is the standard vibration for the roller as used for its road based operations. Preferably the vibrations are within 500 vibrations per minute (vpm) to 5000 vpm. Particularly preferred for compaction of coal is vibration of about 2600 vpm.

The driver 39 also switches on relay 49, which controls the solenoid valve 51, which selectively permits flow of hydraulic fluid to the hydraulic rams system 41 (comprising rams 31 and 33) of the positioning system, causing the roller 23 to descend. The relay 49 also selectively switches off the solenoid valve 51, in which case the rams 31 and 33 go to the default position, i.e., roller elevated. This relay 49 is controlled by the PC 35 via the driver 39 so that the roller 23 is elevated high enough to clear the front wall 18 of the gondola 5 as it passes underneath. The relay 49 is then triggered afterwards by the railroad car moving adjacent the pillars 20 and 21 by another laser-based detection system to descend and engage the particulate material in the gondola 5. At the end of the railroad cars' passage through the compaction station 15, the hydraulic fluid to the hydraulic ram is again switched off by relay 49 and solenoid valve 51 so that the hydraulic rams 31 and 33 cause roller 23 to ascend to its rest position, clear above the gondola 5, so as to clear the rear wall of gondola 5 as well. The roller 23 remains in this elevated position until it clears the front wall 18 of the next railroad car to arrive at the compaction station.

The hydraulic power and the resulting compaction force may be kept constant or gradually reduced by the relay as the car 5 proceeds along, with the roller 23 rolling and compressing the material in the gondola 5 with less force toward the rear of the car 5.

Figure 8:
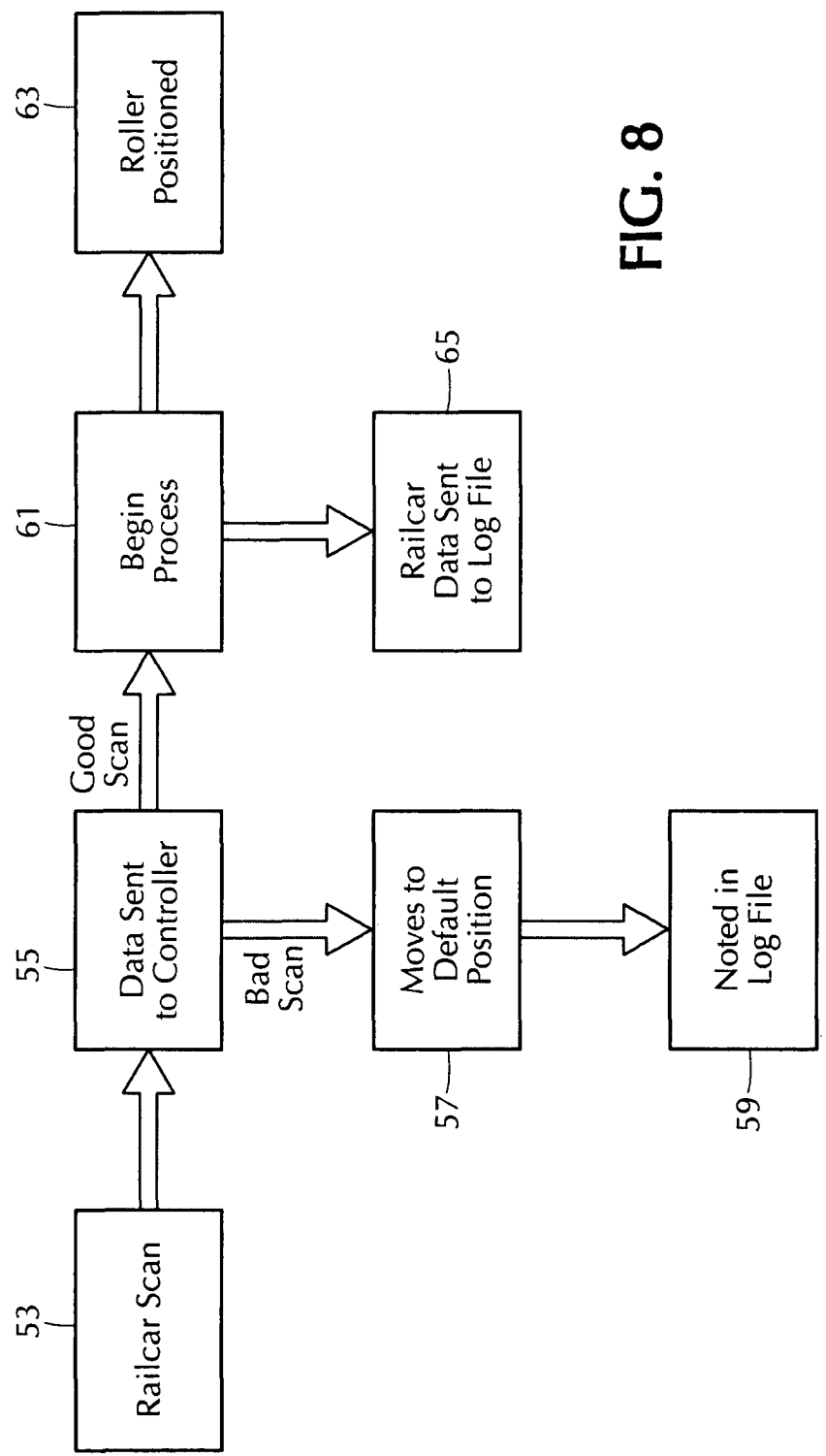
FIG. 8 is a flow chart of the operation of the overall system as controlled by computer.

Referring to FIG. 8, the flow chart shows the logic of the process of the system. The rail car is initially scanned in a scanning step 53 performed at scanning station 7. The data derived from the scan of the rail car RFID tag is then sent to the controlling computer system in step 55. The receiving computer system then determines from this data whether the scan has derived accurate information or if there has been an error or corruption of the data. If the scan is a bad scan with corrupted data or unreliable data, in step 57, the roller 23 is left in the ascended default position, and no hydraulic pressure is applied to the hydraulic rams 31, 33. In addition, step 59 is performed, recording a log of the problem with the scan for possible future maintenance or remedial action. If the scan is good, then in step 61 the process is begun in the compacting activity. Based on the height of the rail car, the roller 23 is positioned via the drivers in step 63. In addition, data is recorded in a computer accessible memory device logging the rail car data derived from the scan in a storage step 65.

The roller 23 is configured for the current application to provide a downward force as has been mentioned of at least 2,000 and preferably at least 20,000 pounds per square inch. This force is provided by hydraulic rams, such as rams 31 and 33 of FIG. 6, and a COTS street surfacing roller may be supported between them. Other structures for supporting the roller 23 may also be used, and the roller itself may be fabricated, not simply taken from an off-the-shelf product.

Figure 9:
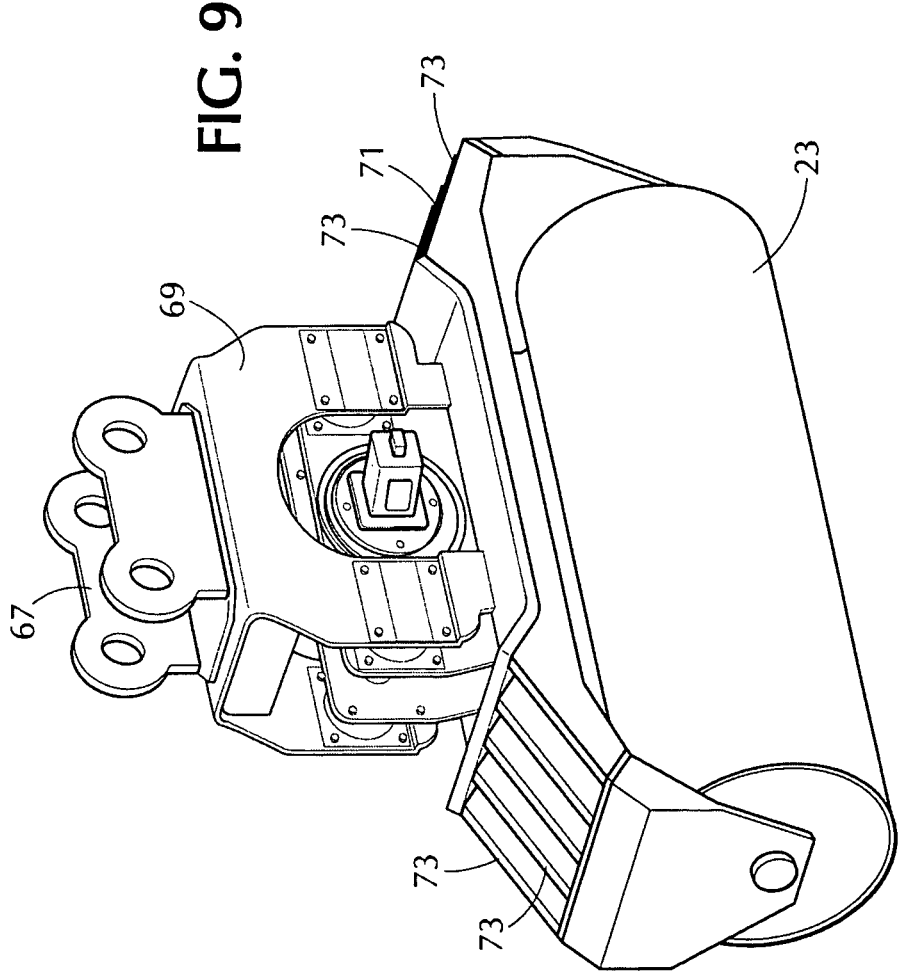
FIG. 9 is an enlarged detailed view of a type of support for a roller according to the invention.

One alternate structure for supporting a fabricated roller is seen in FIG. 9. The roller itself 23 is supported by an apparatus having a top connection structure 67 that connects to a hydraulic system for applying a downward force, such as a beam extending across the tracks in the top unit or palette 17 supported at each end by respective one of the hydraulic rams 31 and 33. This connection structure 67 connects with a downward extending support structure 69 that connects to a gusseted frame member 71. This frame member includes a number of upwardly extending reinforcement vanes 73 that rigidify the structure without unduly adding to its weight, which could present difficulties in terms of raising the roller.

Referring to FIG. 10, the connection of the frame 71 at the end of the roller 23 is shown. The frame 71 includes an end axle supporting portion 75. This portion 75 has therein a bearing hub 77 extending through an aperture 79 to engage with a securement fixture 81 that is affixed to the flat end portion 83 of cylindrical roller 23. The end portion 75 is identical on each side with left and right being mirror images of each other. The bearing structure 81 is a very durable design and is rated to at least 10,000 pound load weighting. The bearing screws securing the outer portion of the bearing hub 80 to the end portion 75 of the frame 71 are rated to 170,000 KSI at a minimum. The end structure 75 is welded to the rest of the frame 71 to ensure a solid structural support for the roller 23.

Figure 11:
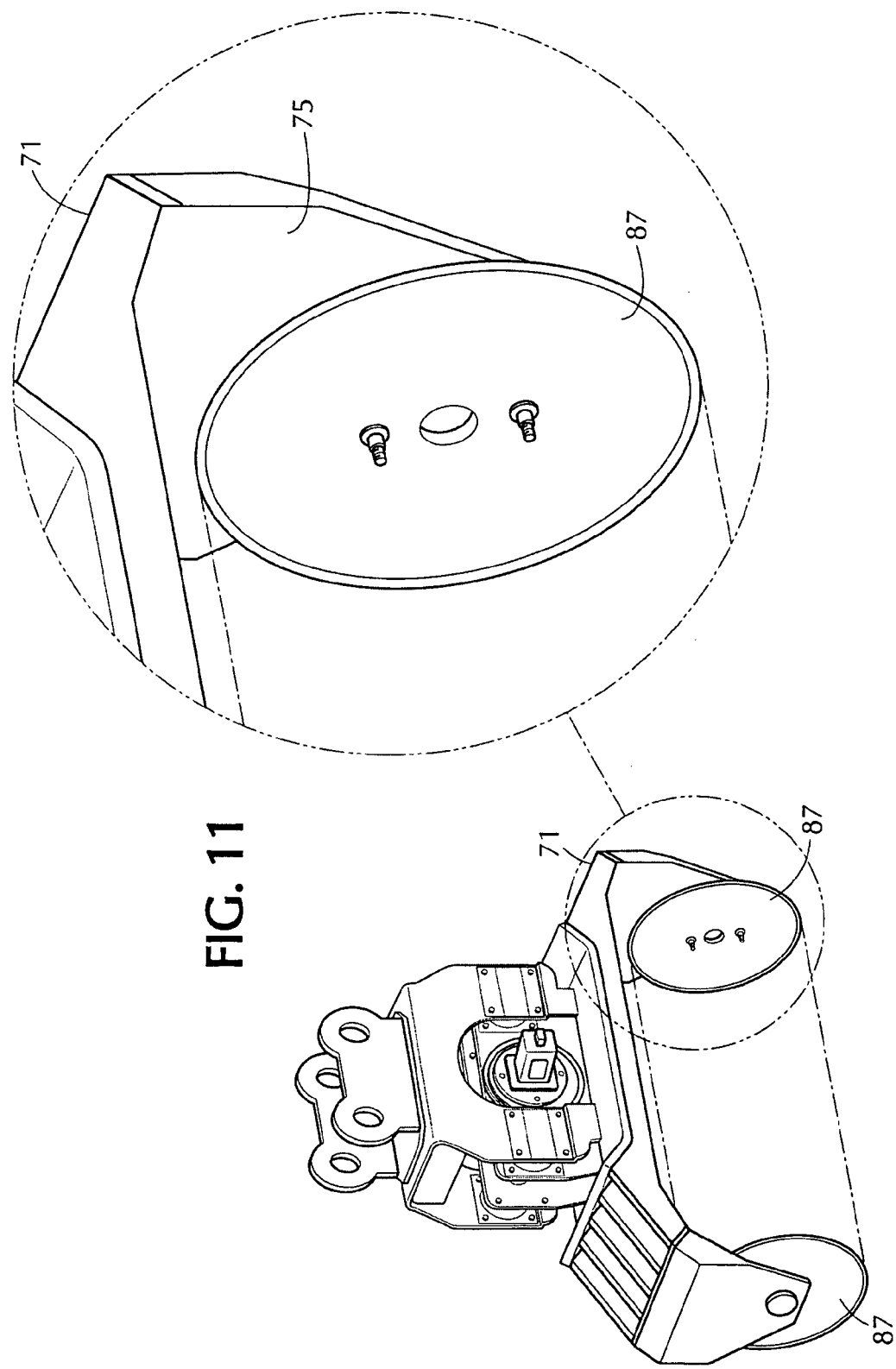
FIG. 11 is a further detailed view of the rollers as attached to the support structure of the compaction system.

Details of the construction of the fabricated cylinder are shown in FIG. 11. The cylinder is in this embodiment a 24 inch scale 40 steel pipe with a ⅝ of an inch wall thickness. It is secured at both ends to a circular connector end plate 87. Each of these is secured to the respective bearing system and then supported on the frame 71.

Details of the structure of the frame are shown in FIGS. 12 and 13. As can be seen in FIG. 12, the frame 71 is secured with end parts 75 at both ends thereof. Ribs 73 extend upwardly from the top of frame 71 and rigidify the structure so that a downward force of substantial magnitude may be applied through this beam structure. Corresponding vanes 76 are found on the end pieces 75 where they are additionally supportive of the load being delivered from the hydraulic rams through the support structure 67 and 69 and then through the frame 71 through the bearings to the roller 23 and to the particulate material being compacted.

Referring to FIG. 13, the underside 86 of frame 71 does not have ribs but is a flat flange 86 of the overall beam of the structure. In addition, the beams of the end portion 75 has gusseted portions 87 that are provided to reinforce the load carried thereby to the roller 23.

Figure 14:
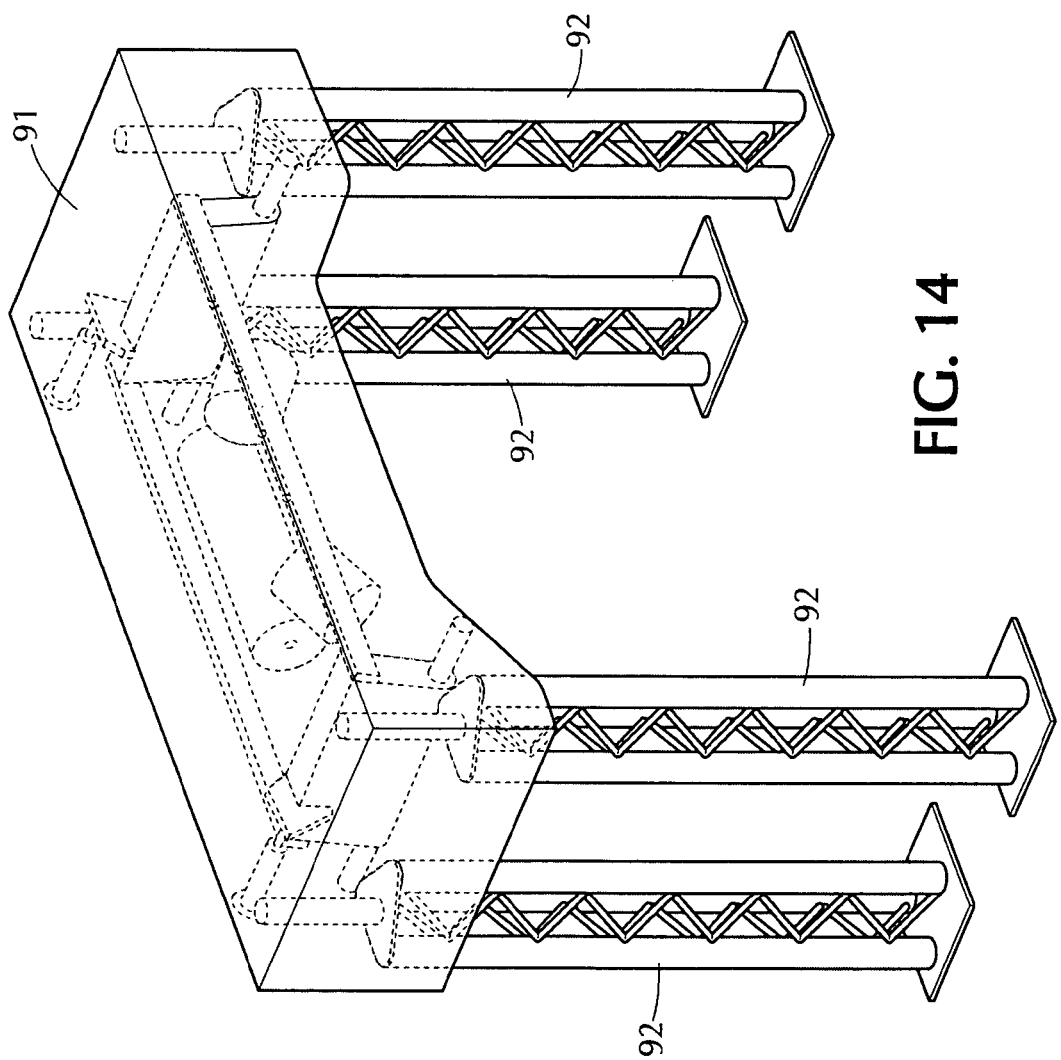
FIG. 14 shows a perspective view of an alternate design of compaction system also known as a compaction station.

Referring to FIG. 14, an alternate embodiment of compacting station is shown. The alternate embodiment has a palette structure 91 supported on four pillars 92, forming an arch structure through which a train and cars can be driven on rails (not shown).

Figure 15:
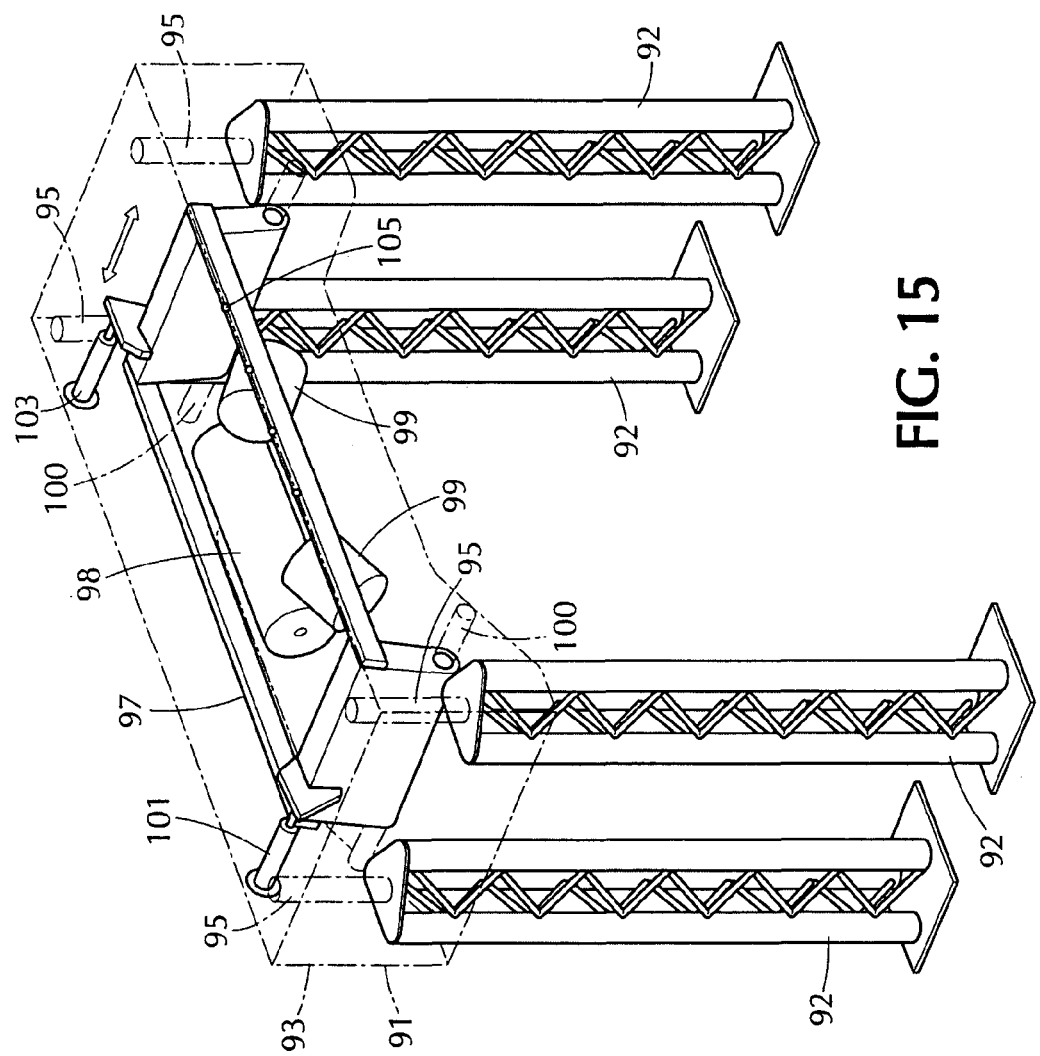
FIG. 15 shows a partly cutaway view of the compaction station of FIG. 14.

Referring to FIG. 15, underneath the outer fairing 93 of the upper palette 91, a movable system is provided in the form of four hydraulic rams 95, one on each pillar 92. When these hydraulic rams are in the default "up" position, the palette 91 is elevated to clear over any car or locomotive passing under it. When supplied with hydraulic fluid, as is discussed above with respect to the earlier embodiments, hydraulic rams 95 drive the palette 91 downward.

Inside palette 91 a frame structure schematically indicated at 97 supports a central horizontally extending roller 98 and two obliquely sloping side groomer rollers 99. These rollers 98 and 99 work together similarly to the horizontal roller 23 of the first embodiment, except that when pressed down they provide for a humped or crowned pile of particulate material in the gondola 5, which is a common occurrence in the transport of coal, due to the coal hopper not being able to pour the coal completely uniformly into the gondola car. The cylinders also may be independently movable, as by a system not shown to cause for instance the center cylinder roller 98 to descend deeper into the gondola 5 to roll over the forward facing sloping surface of the crowned material in the gondola 5.

In addition, the frame 97 that supports the cylinders 98 and 99 is movable by two hydraulic cylinders 101 and 103 for forward and rearward reciprocating movement on support rails 100. The default position for these cylinders 98, 99 is a position that is relatively rearward of the cars being brought through the compacting station. When the hydraulic power unit supplies hydraulic fluid to these additional two cylinders 101 and 103, it causes the frame 97 and the rollers 98, 99 with it to move forward at a speed of approximately 3 or 4 mph over the short length of the guide rails 100.

The vibration of the roller is provided by a system as in the first embodiment, in which an off-center loaded rotating device on a hydraulic pump affixed to the frame 97 is driven by the hydraulic fluid so as to turn at an appropriate rate to produce the vibrations described above. The vibrations proceed through the frame to the roller or rollers of the compaction device. Alternatively or in addition, a vibrating device comprising an off-center rotating load turned at relatively high speed inside the cylindrical body of the roller(s) may be used.

Since the cars are moving at a rate of about 1 mph, this means that the rollers 98 and 99 can move forwardly faster than the car is moving. This allows the use of the hydraulic cylinders 98 and 99 to compress a downward, rearward facing slope of the crowned material in the gondola as well, by, after compacting the entire car down to the rear wall, to return forward faster than the car is moving, so as to compact the rearwardly downward sloping surface at the rear end of the railcar. When this forward movement is completed, the frame 97 and rollers 98 and 99 are returned to the rearward end of the reciprocating movement on the guide rails 100.

The structure of the two additional hydraulic cylinders shown in FIG. 15 can also be advantageously applied to a structure supporting a single roller, such as roller 23 in the embodiment seen in, e.g., FIG. 6, wherein the roller extends laterally substantially across the full interior of the car. In such a case, the operation is the same as described for the three-roller system of FIG. 15, except for the omission of the diagonally positioned rollers. The single roller then can be rolled both rearwardly over the coal as the car moves forward, and forwardly up the rear slope of coal in the car by the frame moving forward faster than the cars are being pulled.

In addition, a spray nozzle system 105 may be provided inside the fairing 93 as well, to spray some surfactant or retaining liquid onto the particulate material.

Figure 16:
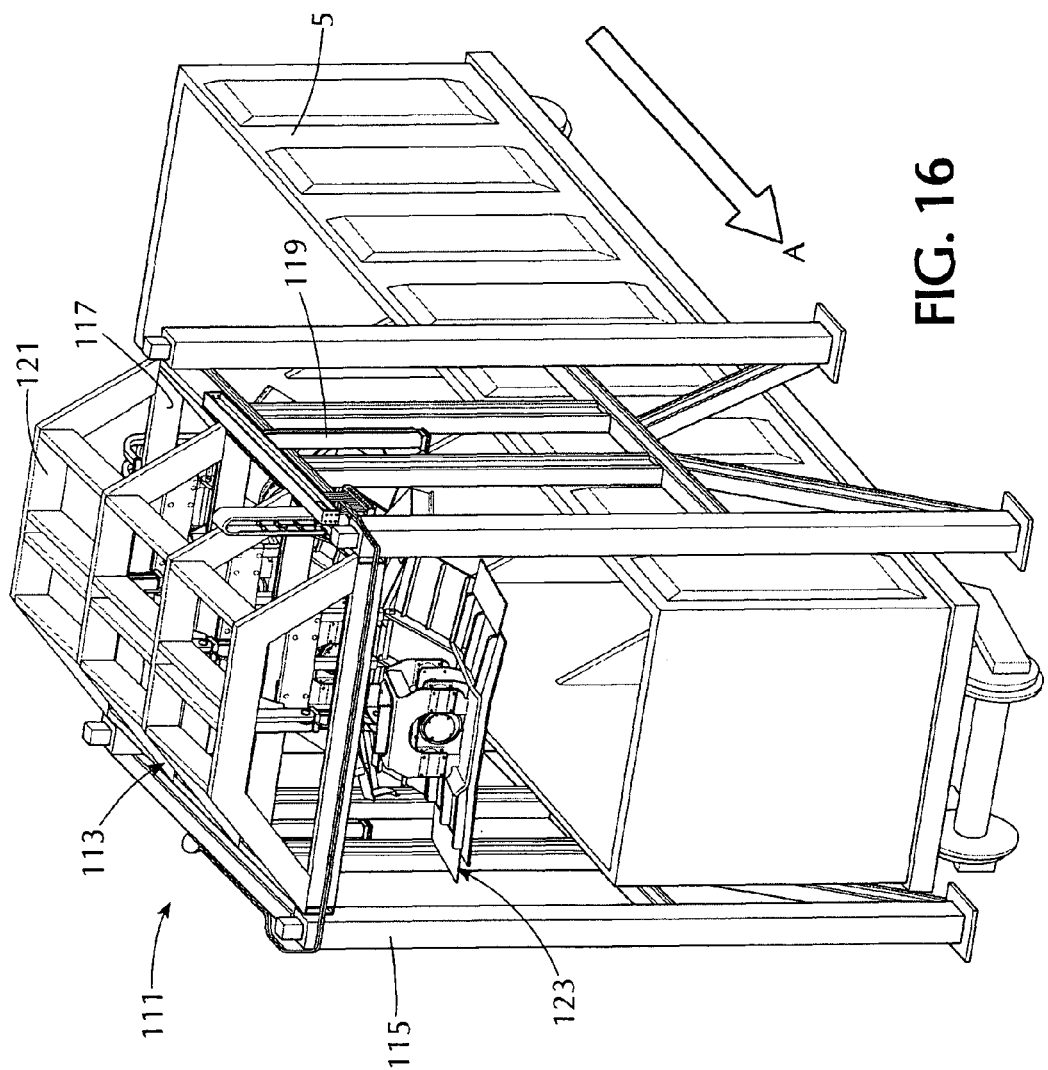
FIG. 16 is a perspective view of an alternate embodiment of compaction system according to the invention.

Referring to FIG. 16, an alternate embodiment of compaction system 111 is shown. This system operates with a computerized system essentially the same as in the previous embodiments, where the approaching railroad cars are scanned with an RFID reader and the data from this reader is transmitted to a computer system that controls the movement of the hydraulics in the compaction platform 113.

Similarly to the previous embodiments, the compaction system 111 is supported on a tower structure 115 on each side of the rails on which the open top gondola cars are moving after they are loaded with particulate lading, most commonly coal. The tower structure 115 supports at its upper end a frame 117, which is a horizontally disposed frame supported for upward and downward movement by operation of two hydraulic cylinders 119. Frame 117 is additionally reinforced by arched support superstructure 121, which is secured above it fixedly so that support structure 121 and 117 form a unitary structure that can bear the loads created by the compaction and the interaction of the compaction system 111 with the railway cars that it operates on.

Hydraulic cylinders 119 are configured to elevate the structure 117 and 121, together with the three compactor or groomer stations, generally indicated at 123, depending from the structure 117 and 121, responsive to the computer control. The default position of the frame 117 in a situation where there is no pressure in the hydraulic fluid is raised with full clearance for a locomotive or a gondola car or any other railroad car to pass thereunder. Hydraulic fluid is supplied under computer control to the cylinders 119 as appropriate to cause the frame 117 to descend to an operating distance above the gondola car. The computer system times the elevation so that a gondola car 5 wall, or a locomotive (not shown) or other railway car may pass underneath the compacting stations freely in this raised condition. Once the front wall of the railway car is clear, the computer activates the hydraulics 119, which force the structure 117 and 121 and the groomer stations 123 downward so that the stations 123 can engage with and compact the coal in the gondola car 5 when appropriate. The computer similarly elevates the frame 117 and the stations 123 to clear the back wall of the gondola 5 as it passes under the tower 113.

Figure 17:
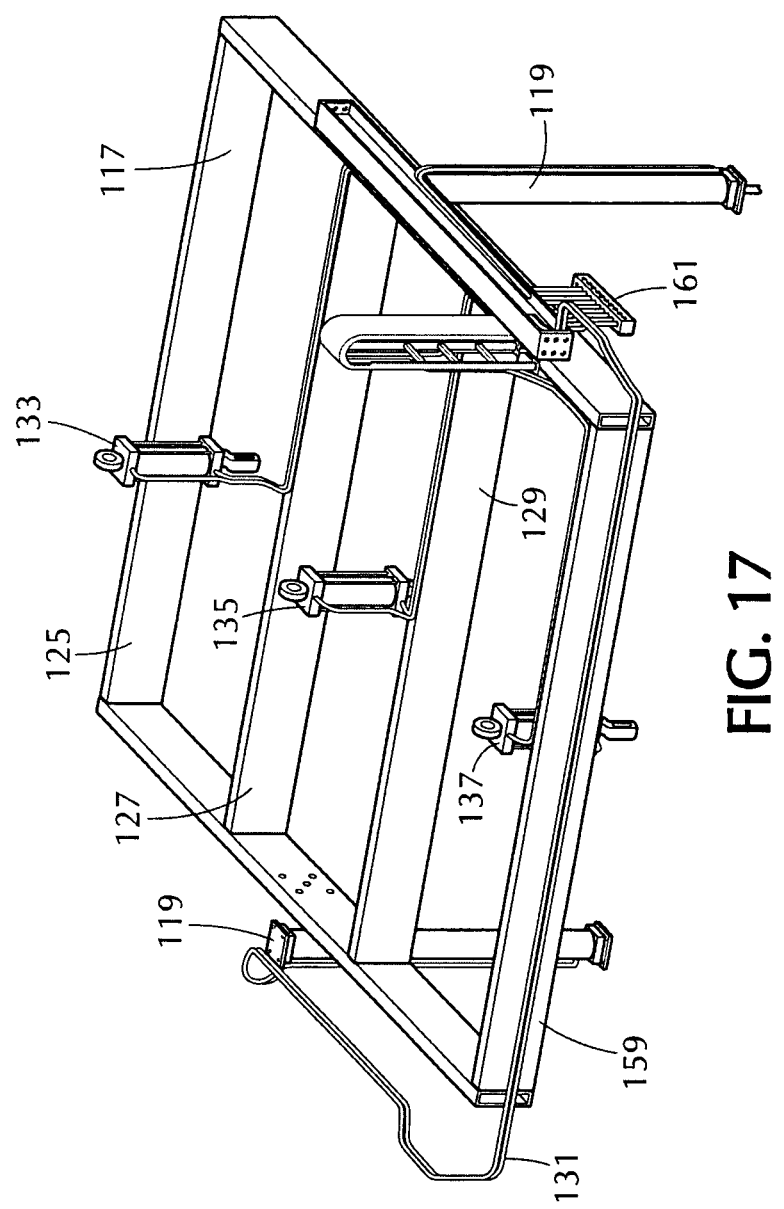
FIG. 17 is a perspective view of the frame supporting the hydraulics of the alternate embodiment of the compaction system.

Referring to FIG. 17, frame 117 is supported on hydraulic cylinders 119 for reciprocal vertical movement. The hydraulic cylinders 119 are controlled by the computer system to avoid contact between the groomer stations 123 and the coal except when grooming is appropriate. The frame itself is constructed of an outer rail 125 of roughly square construction and two lateral cross beams 127 and 129 which define therebetween three spaces in the frame 117 through each of which a respective one of the grooming stations extends.

Hydraulic lines 131 of stainless steel hydraulic tubing run to the cylinders 119 from a stationary hydraulic manifold 161. The hydraulic manifold 161 has a number of outlets that are independently operated by the computer system to allow or interrupt hydraulic fluid flowing through the lines 131 to the respective cylinders 119 to selectively elevate or lower the overall frame 117. Other outlets of the manifold 161 are connected by lines of flexible material to the individual hydraulic cylinder structures 133, 135, and 137 of compaction stations 139, 141 and 143 to selectively elevate or lower them for compacting the coal. The manifold 161 is connected to and controlled by the computer system that controls operation of the grooming/compactor system, and can selectively control the vertical movement of frame 117, and each of the individual cylinders 133, 135 and 137 to move independently of each other as the computer system directs. When actuated by the computer, the manifold directs hydraulic fluid to the selected cylinder or cylinders, and they apply downward force to the frame or grooming station so as to move it downward to groom and compact the coal or particulate material in the gondola car.

The hydraulic cylinders are preferably off-the-shelf products manufactured by the company Lehigh Fluid Power, Inc., of Lambertville, N.J. The two hydraulic cylinders 119 for elevating the frame are preferably each a 6-inch bore, 60-inch stroke hydraulic cylinder. The hydraulic cylinders controlling the independent movement of each of the grooming stations 133, 135 and 137 are preferably each a hydraulic cylinder with a 6-inch bore and a 12-inch stroke.

Figure 18:
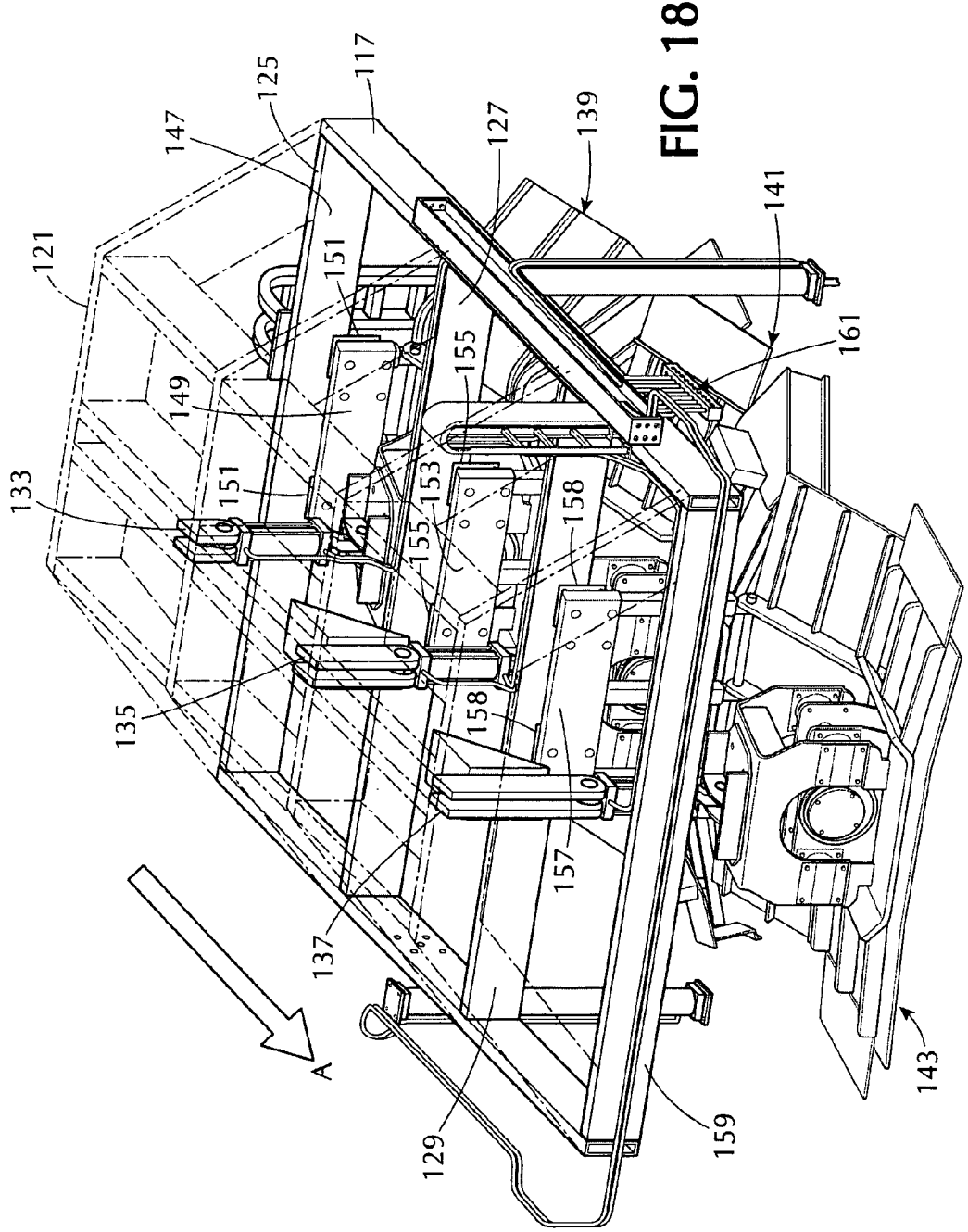
FIG. 18 is a perspective view of the compaction system of FIG. 16 showing also the three grooming stations of the alternate embodiment with the exterior support superstructure shown in phantom.

Referring to FIG. 18, the support structure 121 (shown in phantom) is secured operatively to an upper end of each of the hydraulic cylinder structures 133, 135, and 137. These hydraulic cylinder structures each include a respective rigidly mounted beam that extends downward from the superstructure and pivotally connects with the respective hydraulic cylinder, each of which is pivotally connected at its lower end to a respective one of grooming station I generally indicated at 139, grooming station II generally indicated at 141, and grooming station III generally indicated at 143. Each of these grooming stations is associated with a respective hydraulic cylinder 133, 135 or 137 and is independently movable responsive to pressurization thereof.

The first grooming or compaction station 139 is supported longitudinally between the first crossbeam 127 and rear beam 147 of the frame 117. The grooming station 139 is supported and secured to the rear beam 147 by a vibration-isolating connection structure 149, which is similar to a vibration isolating engine mount. Connection structure 149 is secured to beam 147 with bolts extending through elastomeric cushioning pads or donuts generally indicated at 151. This pair of laterally-spaced elastomeric pads prevents transmission of vibrations from the grooming station 139 to the cross rail 147. Similarly, the second grooming station 141 is located between cross beams 127 and 129 of frame 117, and is secured by a vibration isolating mounting structure 153 secured to crossbeam 127, similarly to the vibration isolating system 149. The connection and support structure 153 includes bolts which secure the station to the crossbeam 127 through a pair of elastomeric pads or donuts 155 between the mounting structure 153 and the crossbeam 127 that prevent the passage of vibrations therebetween. Finally, the third station 143 is located longitudinally between crossbeam 129 and the rearmost crossbeam 159 of the frame 117. Third grooming station 143 is supported on a vibration isolating connection structure 157 secured to crossbeam 129, which also includes two elastomeric vibration isolating pads 158 as in the other two connection structures 151 and 155.

Figure 19:
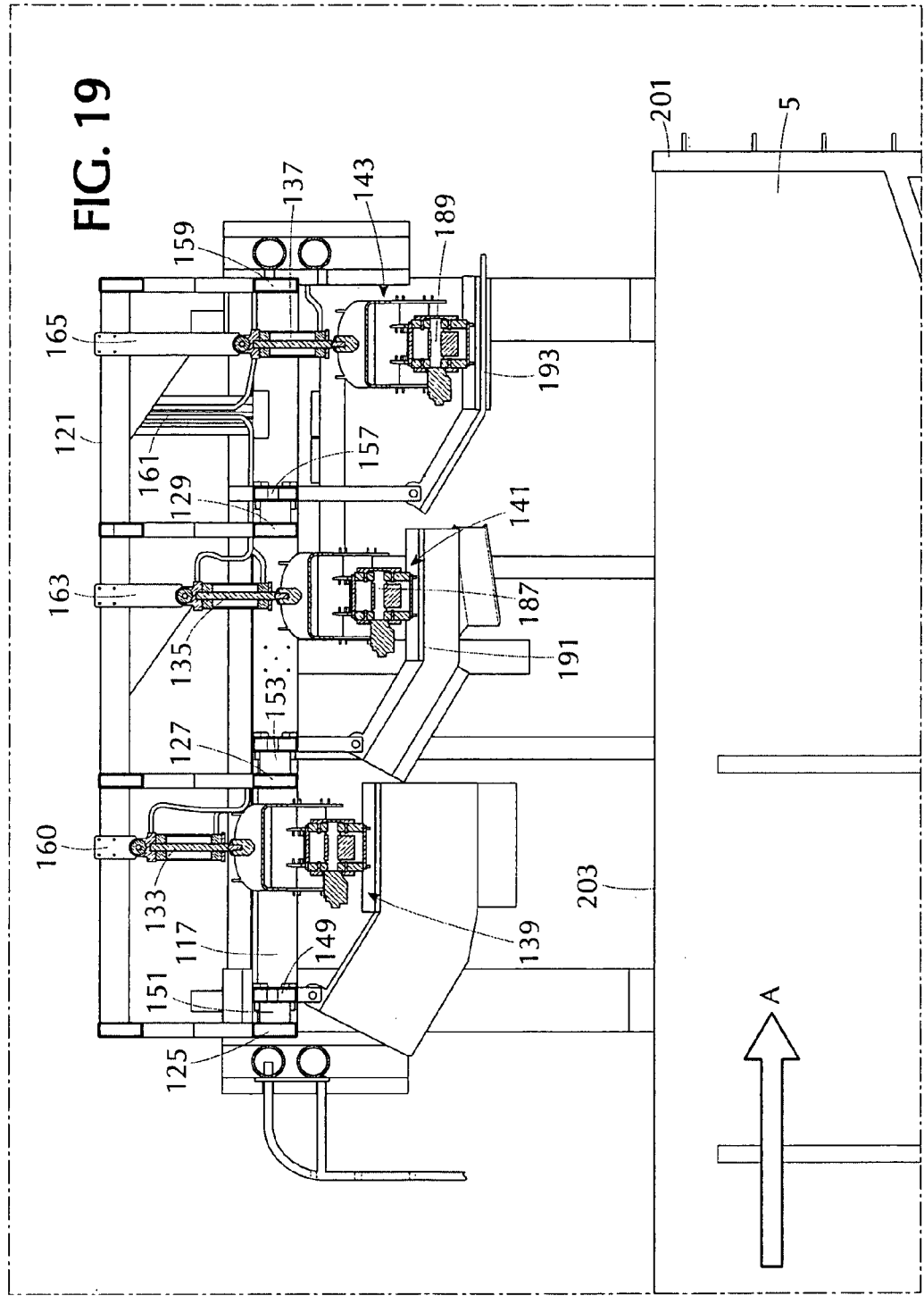
FIG. 19 is a side schematic view showing the three stations of the compaction system of the alternate embodiment.

Referring to FIG. 19, the gondola cars 5, one of which is shown, are loaded with coal or other lading, and proceed through compaction system 111 in a travel direction A. In the schematic of FIG. 19, the structure of the compaction system is shown in an elevated condition. The relative operating heights of the three different stations 139, 141, 143 are visible in this schematic. Station 1 (139) has the highest relative position, and it contacts the coal or particulate matter in the gondola first, in its least compacted state.

Station II is somewhat lower, and the hydraulic cylinder structure 135 that activates this station 141 includes a downwardly extending extension beam 163 affixed to the reinforcement frame 121, causing the extension stroke of the cylinder of structure 135 to press the grooming station II (141) to a lower distance. The vibration isolation connection 153 also includes extension beams extending downwardly from the level of frame 117, to provide Station II at a lower height.

Station III has an even longer extension support 165 that is fixedly secured to the reinforcement structure 121 and extends fixedly downward therefrom to provide a lower height from which hydraulic cylinder 137 presses Station III downward. Connection structure 157 also has extension beams projecting downwardly from the frame to provide the lower operating height of Station III.

Figure 20:
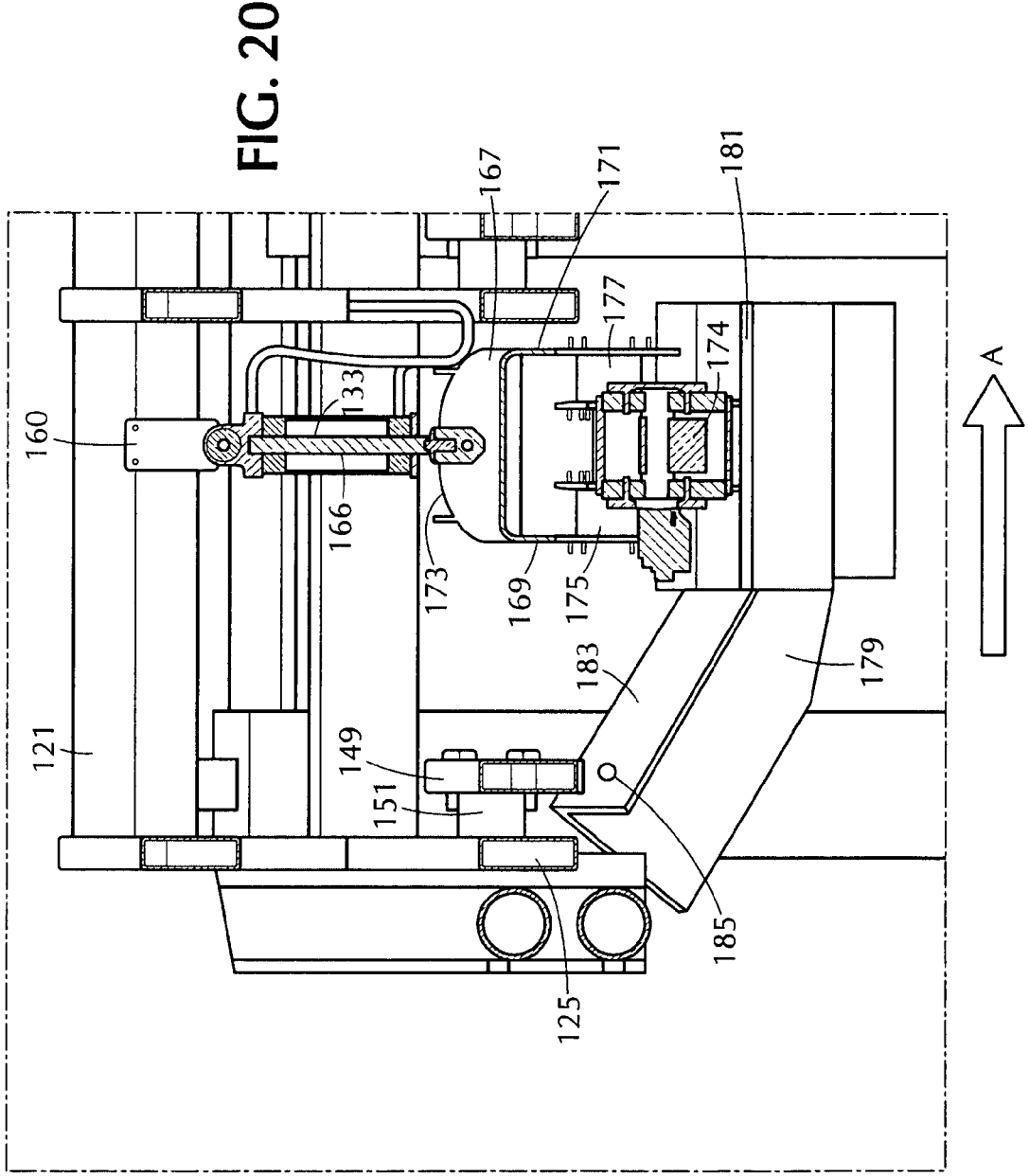
FIG. 20 is a detailed schematic view of the side of the first station in the compaction system of the alternate embodiment.

Referring to FIG. 20, Station I comprises hydraulic cylinder structure 133 secured on downward extending bracket support beam 160 on support structure 121. The upper end of the hydraulic cylinder 133 is pivotally secured to support beam 165 and the lower end is pivotally secured to a housing 167. Housing 167 includes two longitudinally spaced vertical walls 169 and 171 extending downwardly from rigidified upper securement structure 173, which comprises a horizontal wall extending between the walls 169 and 171 to form a box- or channel-shaped structure, with reinforcing gussets affixed inside strengthen the structure. In addition, structure 173 has a reinforcement structure affixed to its upper surface, with vertical flanges pivotally connected with cylinder 133.

A hydraulic vibrator 174 is supported between two flanges fixed to and projecting upwardly from compaction plate 181. These flanges are secured by a vibration-isolating connection to walls 169 and 171 through two pairs of pneumatic vibration isolators 175 and 177. The flanges link the hydraulic vibrator 174 to the contour surface structure 179 at their lower ends, affixed to the contouring surface structure 179. The vibrator 174 is driven by pressurized hydraulic fluid and imparts vibration to the compaction surfaces, as will be discussed further below.

Contouring surface compacting structure 179 includes a first plate portion 181, generally horizontal in FIG. 20, which is connected with an upwardly sloping plate portion 183, which extends forward and slopingly upward from the forward edge of plate 181. The forward end of plate 183 is secured by a pivotal connection 185 which allows rotation about a transverse horizontal axis of rotation of the apparatus. The pivotal connection 185 joins the compacting grooming surface structure 179 to the connection structure 149 that connects through pneumatic vibration isolators 151 to the forward beam 125 of frame 117. The pivot 185 allows surface compacting structure 179 to rotate about the axis of rotation as the hydraulic cylinder 133 extends or contracts, lowering or elevating the hydraulic vibrating compactor 174 and the associated compacting portions of Station I.

Stations II and III are similarly configured for up and down movement, each having a respective hydraulic vibrating compactor 174 that is supported between front and back walls 169 and 171 by a pneumatic vibrating isolator system similar to that shown in FIG. 20. This general structure is visible in FIG. 19, where vibrating component 187 of Station II and vibrating component 189 of Station III are shown fixedly secured to their respective grooming surface structures 191 and 193.

Figure 21:
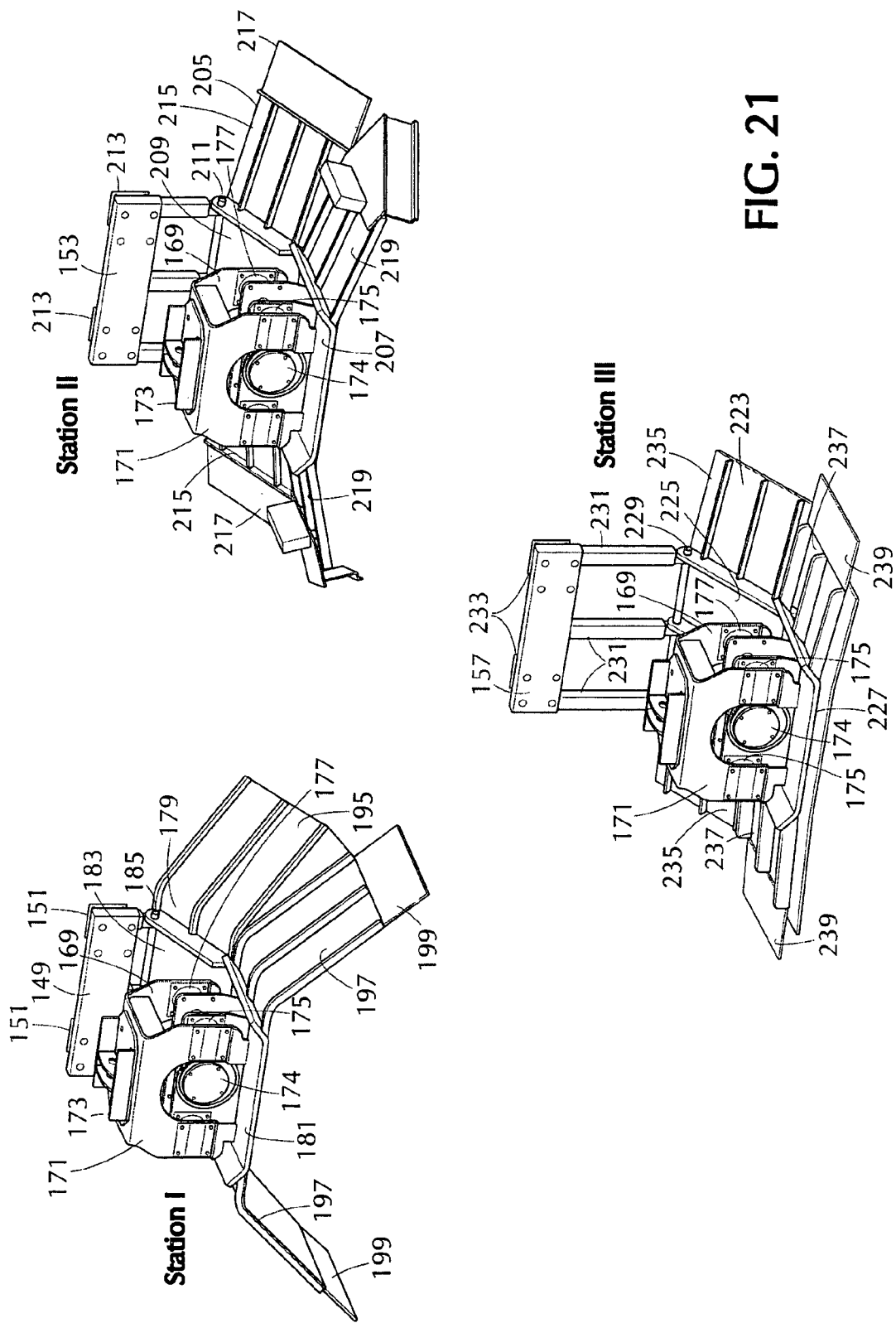
FIG. 21 contains a perspective view of each of the three stations of the compaction system of the alternate embodiment.
Figure 22:
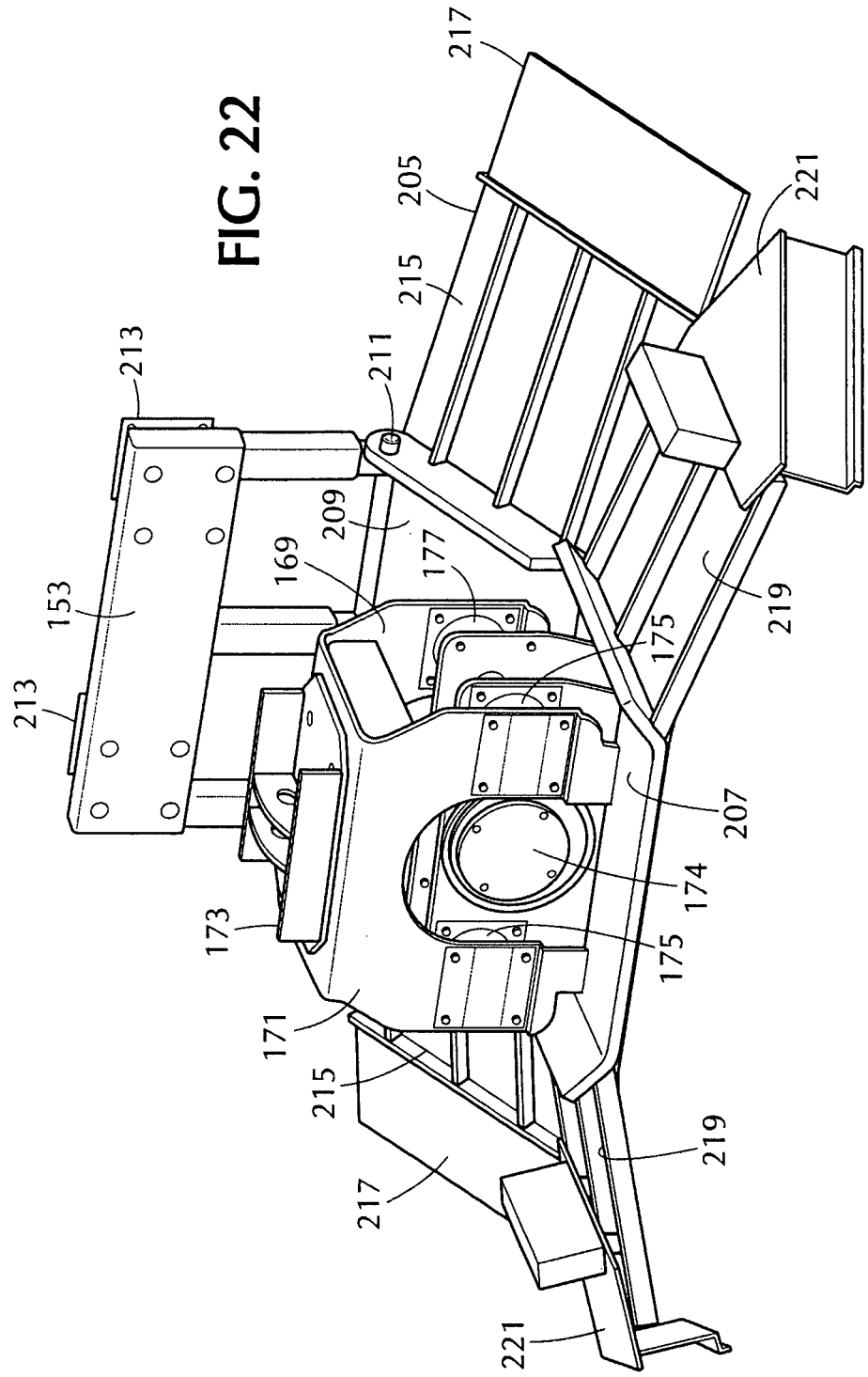
FIG. 22 is a detailed perspective view of the second station of the compaction system of the alternate embodiment.

As best shown in FIG. 21, Station I comprises grooming structure 179 which is pivotally secured about rotational connection 185 to the vibration isolating connection 149 with its two pneumatic vibration isolators 151, which prevent vibrations created by the pneumatic vibrator 174 from reaching into the overall compaction system 111. The grooming surface structure 179 comprises a first plate 181 joined with an upwardly sloping initial engagement plate 183 that is angled upwardly at approximately a 30 degree angle relative to horizontal and extends forward from the front edge of plate 181.

Together, sloping plate 183 and horizontal plate 181 make up a laterally center part of the Station I, and this provides planar compacting at the top of the pile of particulate material or coal in the gondola car.

The grooming surface structure 179 also includes obliquely extending side plates 195 formed integrally with and extending obliquely downwardly and laterally from the lateral sides of plate 183, at an angle of about 45 degrees to the plate 183. The width of the structure from lateral extremities of plates 195 is slightly less than the interior width of the lading space in the gondola. Obliquely extending plates 197 are formed integrally with and extend obliquely downwardly from the lateral sides of horizontal plate 181, angulated at about 45 degrees to the plate 181. The lower ends of these plates 197 are near the width of the interior space of the gondola car, and each plate 197 each equipped with a hard rubber flap 199, which allows the grooming surface structure 179 to contact the upper chord of the side rails of the gondola car without a metal to metal contact which might be damaging to either the grooming structure or the railroad car, and also to partially enclose the coal pile in the car 5 to prevent pieces of coal from falling out of the car during compaction. Plates 195 and 197 are rigidified by ribs extending upward from their upper surfaces.

The forces imparted to the coal for compaction are similar to the forces applied to the coal in the first embodiment. The vibrator device 174 may be the eccentrically-loaded hydraulic motor described in regard to the roller embodiment. The vibrator compactor 174 provides a vibration that is preferably approximately 40 Hz, or 2400 vibrations per minute, although other vibration speeds may be used efficaciously.

The vibrator 174 is isolated by virtue of four pneumatic vibration isolators 175 and 177, which are in pairs, one pair in front between the vibrator and the wall 169 and the other pair between the vibrator 174 and the rear wall 171, so that vibration is transmitted substantially solely through front and back flanges fixed to and projecting upward from plate 181 of the grooming surfaces structure 179. To the extent that the vibration is transmitted into the pivot support 185, this vibration is also isolated in the pivoting grooming surface 179 by the pneumatic isolators 151 between the connector 149 and the frame 125.

The downward force applied to the top wall and support structure 173 by hydraulic cylinder 133 and the overall weight of the system is approximately 3,000 lbs. of continuous downward force, and, when combined with the vibration, results in a periodic vibrating force, with a maximum impulse force of about 24,000 lbs., i.e., a maximum total force 27,000 combined. These force levels may be adjusted as appropriate to the given application. The pressure on the coal from the compactor stations is in the range of 2 to 50 pounds per square inch (psi), and preferably in range of 7 to 19 pounds per square inch, and most preferably about 8 psi. Maximum psi should not exceed 50 psi. Similar vibration and force and pressure are applied to the coal at each of the Stations I, II and III.

Station I starts the compacting process of the crown of the material in the gondola car. As the gondola car 5 rolls forward, the first contact is with the loaded particulate at plate 183, which engages the coal with a downward facing engagement surface on its lower side, and that of the side wings 195, and starts to wedgingly press it down, sliding over the coal, until it reaches the contiguous surface under plate 181, and under its side wings 197, where it is compacted to a final height, and first Station I passes rearward of the car 5 to the coal further back. This initial compacting is applied immediately as the gondola car's front wall 201 passes underneath the first grooming Station I. The vibration and downward force compress the particulate material to the level of the trailing edge of plate 181, which is approximately 10 inches above the top side chord 203 of the railroad car 5. The sloping lateral plates 195 and 197 also create a groomed compacted crown on the coal, and the rubber flaps 199 prevent the coal or particulate matter from falling out of the railroad car. Plate 181 preferably is close to horizontal during this compaction, but may also be at an angle due to pivot 185 and the height of the coal.

Referring again to FIG. 21, Station II comprises a vibrator 174 in a housing that is essentially the same structure as the vibrator housing of Station I. The housing comprises a top wall and reinforcement structure 173 that is engaged pivotally with hydraulic cylinder 135 at its lower end, and forms a generally channel-shaped gusseted structure with a forward wall 169 and a rearward wall 171 that support the vibrator 174 therebetween between vertical flanges projecting upward from the top of the compacting surface structure, which are bolted in vibration isolation connection to walls 169 and 171 through another two pairs of pneumatic vibration isolators 177 and 175, thus isolating the vibrator 174 and the vibrating compaction surfaces from the hydraulics and the outside housing.

The vibrator 174 of Station II is fixedly secured to the grooming surface structure 205, which has a downward facing angulated set of surfaces to engage and compact the coal as it slides over it. Structure 207 includes a planar middle plate 207 and a diagonally extending upwardly angled surface plate 209, which extends up integrally from the front edge of plate 207 to the pivotal connection 211 that secures the grooming surface structure to extension beams connected to the vibration isolation connection 153. The connection structure 153 is secured to crossbeam 127 of frame 117 via a pair of pneumatic vibration isolators 213, so that vibration of the grooming surface structure 205 is not transmitted to the frame 117.

Grooming surface structure 205 also includes two downwardly angulated and laterally extending grooming surface side plates 215 which each end in a respective rubber flap 217 to allow for a close contact with the upper chord 203 of the gondola car 5 to prevent the loss of particulate matter as the compacting proceeds, and also to allow contact between the rubber flaps 217 and the top chord without damage. In addition, Station II has two downwardly obliquely extending plates 219 each projecting downwardly and outwardly from a lateral outward edge from the horizontal plate 207. Plates 219 have secured to their outward lower extremities or ends trenchers 221. These trenchers 221 scrape together the particulate material underneath these surfaces 219, so as to move it slightly laterally inboard and to create a space on either side of the crown of the coal material that allows for one or two inches or more of space on either side between the top of the coal pile after passage through station 2 and the inside of the side wall of railway car 5. Generally, the metallic surfaces of all stations are narrower than lateral width of the inside of the gondola car, while the rubber flaps are configured to at least partially overly the top chords of the side walls of the gondola.

The diagonal upward slope of the coal engaging surface of the underside of plate 209 of Station II is approximately 30 degrees, and it slides over the compacted coal crown produced by station I, compacting it to pass under the contiguous undersurface of plate 207, which is preferably near horizontal during operation. A similar sliding compaction occurs with side wings 215 and 219. The coal is reduced to a second compaction height defined by the trailing edge of the undersurface of plate 207. The forces and the vibration applied at Station II are the same as for Station I. The compression of the material after Station II passes over the coal is preferably down to approximately five inches above the top rail of the gondola car 5.

The downward angle of the side plates 195 and 197 of Station I relative to center plate 181 is approximately 45 degrees due to the likely high humping of the coal or particulate matter in the gondola car after it is loaded, but before any compacting. In contrast, in Station II, the downward angle of the lateral wing plates 215 and 219 may be as little as ten degrees relative to the associated plates 209 and 207 due to the increased compaction of the coal at this stage and the reduction of the height of the crown of the material in the gondola car 5.

Station III is the final compacting and grooming station of the compaction system. The grooming system of Station III includes an identical vibrator structure 174 supported in a substantially identical housing i.e. front and rear walls 169 and 171 and two pairs of vibration isolators 175 and 177 suspending a pair of flanges affixed to the compaction plates with the vibrator 174 therebetween. The grooming surfaces 223 of station 3 are comprised generally of a first sloping plate 225 and a generally horizontal plate 227 located directly below the vibrator 174 and fixed thereto. The structure is pivotable about pivotal connection 229 which connects to the lower end of support beams 231 which extend downwardly from vibration isolating connection structure 157 which has a pair of pneumatic vibration isolator pads 233 secured to crossbeam 129 at frame 117 and isolating therefrom the vibrations of vibrator 174.

In addition, Station III includes two generally horizontal and slightly downwardly extending plates 235 on either lateral side of oblique plate 225 and a final finishing surface formed by slightly downwardly extending plates 237 on either side of generally horizontal plate 227. These plates 237 each end in a respective rubber flap 239 that rides along the top chord of the railway car 5. At this stage of compaction, the forces and vibrations speeds being the same as the first and second stations, the coal is now compressed down to a height which is nearly flush with the top chord of the railway car 5, with at most a slight hump in the middle of the car, reflected in the slight angulation of the lateral plates 237. The forces and the vibration applied at Station III are the same as for Station I and Station II. The rubber flaps 239 partially enclose the car and prevent loose coal that did not become the compressed coal from falling out during this final grooming process, which leaves a slightly humped but tightly compressed load of particulate matter in the gondola car.

The rubber flaps are made of hard rubber or other elastic material that can contact the chords of the top of the railway car 5 without damage. The remainder of the structures i.e. all the plates of the surfaces of grooming surfaces 179 of grooming station 1 or 205 of station 2 and 223 of station 3 are formed of preferably stainless steel, and are reinforced with ribbed flanges projecting upwardly therefrom to provide rigidity to allow the compaction of the coal under them, with the attendant forces.

The system results in the guards and grooming tools which prevent coal from escaping the car or from being left on the top chords of the gondola car, or for intruding into the mechanical parts of the equipment, i.e. into the movable surfaces of the compaction system.

The operation of this compaction system is preferably fully automated and computer controlled, and the movement of the frame 117 up and down with the associated grooming stations is totally controlled by the computer with the necessary information that is derived from the RFID scanner, as well as laser scanners that actually detect the approach and dimensions of the car apart from the tag data. This system allows for independent use of the three stations so that the process can function as efficiently as possible.

In operation, based on the dimensions of the car determined from, e.g., the RFID tag data, the frame and grooming Stations I, II and III are elevated to a reasonable height to clear the front wall as the gondola approaches. The front wall of the gondola passes Station I, and Station I is then lowered by its hydraulic to contact the coal toward the front of the car. As the front wall passes Station II, Station II is lowered to contact the coal that has been compacted already by Station I. As the wall passes Station III, Station III hydraulics lower Station III to finish the compaction of the coal already compressed and groomed by Stations I and II. Stations I, II and III are then elevated, preferably each individually, as the rear wall of the gondola reaches them. The process is then repeated for the next railcar. Alternatively, the frame 117 may be elevated to clear all Stations I, II and III over the rear wall.

The hydraulics and the location of the grooming stations accommodate coal of varying heights and function at current loading speeds, which means that in this alternate embodiment it is also possible to run the cars continuously without stopping and provide a contoured, compacted upper surface to the coal which will reduce the loss of coal due to the movement of the car or passage of air.

The above embodiments have been described as using laser systems to detect the approach and possibly dimensions of the gondola cars as they come to the compacting station. In the environment of a coal loading system, there is a great likelihood of dust in the air, with a resulting limit on visibility that may affect operation of a laser or light-based scanning and detection system. Accordingly, ultrasound detectors may be used in place of the laser systems described herein.

The vibration of the rollers or plates in the above embodiments is accomplished using hydraulic vibration systems. Electrical vibration systems may be employed in place of the hydraulics systems described above. Electrically powered vibrators then take the place of the hydraulic vibrators, and cables carrying electrical power replace the conduits that carry the hydraulic fluid to the hydraulic vibrators.

The computer systems that control the operation of the compacting system were above described as PC-based. Instead of a PC computer, the compactor control system also may include or be based on a PLC (Programmable Logic Controller) that controls movement of the pallet and the hydraulic cylinders that move the various rollers or plates of the embodiments so as to clear the locomotive or the walls of the gondola cars, and to drop down into the interior spaces of the gondola cars so as to compress the coal or particulate material. The PLC is an electrical hardware system configured for automated process control, and it usually contains a microprocessor and some accessible memory storing software loaded into it that causes it to appropriately manage the process, as well as a number of input or communications ports for coordinating the process based on relevant inputs, such as the signal produced on detection of the space between railcars by the scanner. The PLC is similar to a PC, but its internal programming is specialized for motion control systems. The PLC has embedded software that makes it easier to control motion in a system without the underlying code that a PC system requires. The PLC system, or a combined PLC/PC control system, has the capability both for data processing/billing and also motion control of the compactor system, preferably in that the compaction process and the elevation of the compacting apparatus to clear the railway cars and locomotive, etc., is controlled by the PLC, while a connected PC system is provided with process data, e.g., how many gondola cars have been compacted, for system management, billing where there is a per-car charge, and any other maintenance or higher level operations.

The terms of this specification should be considered terms of description rather than limitation, and those of skill in the art, with this disclosure before them, will be able to make changes or modifications therein without departing from the spirit of the invention.

What is claimed is:

1. A compacting system for compacting particulate matter in open-top railroad gondola cars rolling on rails, the compacting system comprising:
    a first compacting station adjacent the rails, a second compacting station, and a third compacting station;
    a scanning system that scans each of the gondola cars as said gondola cars move along the rails toward the compacting station, said scanning system transmitting data of each gondola car to an electronic control system; and
    the first compacting station having a first compaction member configured to contact an upper surface of the particulate matter in each of the gondola cars;
    the electronic control system controlling said compacting station so that the first compaction member engages with and applies force to the upper surface of the particulate matter in each gondola car so as to compress said particulate matter in each gondola cal;
    wherein the first compacting member includes a first generally planar plate structure engageable with the particulate matter, the first plate structure being operatively associated with a vibration system imparting vibration to the first plate structure as the first compaction member compacts the particulate matter;
    wherein the second compacting station includes a second compacting member including a second plate structure, the second compacting station engageable with the upper surface of the particulate matter;
    wherein the third compacting station includes a third compacting member including a third plate structure, the third compacting station engageable with the upper surface of the particulate matter, and
    wherein the plate structures of each of the compacting members are supported sequentially relative to the rails with the first plate structure compacting the particulate matter to a first height, the second plate structure compacting the particulate matter to a second height lower than the first height, and the third plate structure compacting the particulate matter to a third height that is lower than the second height.

2. The compacting system of claim 1 wherein the particulate matter is coal.

3. The compacting system of claim 1 wherein the scanning station includes a laser or ultrasonic detection system that detects when each of the gondola cars passes a location on the rails.

4. The compacting system of claim 1 wherein the scanning station includes an RFID reader that interrogates a respective RFID tag on each of the gondola cars, and the data transmitted to the control system includes RFID data derived from the interrogation of the RFID tag, the control system accessing a database using said RFID data and obtaining therefrom railcar data, said railcar data being used to control operation of the compacting station so as to clear a forward wall of the gondola car as said gondola car moves past the compaction station on the rails.

5. The compacting system of claim 1 wherein the compacting station comprises at least one pillar structure on a side of the rails supporting the compacting member above the rails for reciprocal generally vertical movement between an upper position wherein the compacting member is high enough to permit a locomotive drawing the cars and the front and rear walls of the gondola cars to pass thereunder, and a lower position wherein the compacting member engages the upper surface of the particulate matter and compacts the particulate matter.

6. The compacting system of claim 1 wherein the plate structures are pivotally supported on a frame of the compacting station, and the frame is supported for reciprocal generally vertical movement of the compaction station.

7. The compacting system of claim 1, wherein the force applied on the particulate matter from the compaction member is in the range of 2 to 50 pounds per square inch (psi).

8. The compacting system of claim 1, wherein the force applied on the particulate matter from the compaction member is in range of 7 to 19 pounds per square inch.

9. The compacting system of claim 1, wherein the force applied on the particulate matter from the compaction member is about 8 psi.

10. The compacting system of claim 1, wherein the control system includes a computer or a programmable logic controller.

11. A compaction station comprising:
    a support structure supporting a compaction member extending laterally across and above a pair of rails configured to carry railcars;
    said compaction member being supported for reciprocal vertical movement between an upper position and a lower position;
    the upper position being such that a locomotive and a front wall and a back wall of a gondola car can pass on the rails under the compaction member; and
    the lower position being such that the compaction member in the lower position engages and applies a downward compacting force to a surface of particulate matter in a filled gondola car with an open top cargo space when the gondola car cargo space is below the compaction member; and
    the compaction member being of a lateral dimension small enough that the compaction member fits into the cargo space of the gondola;
    wherein the support structure comprises at least a pair of pillar structures, each on a respective side of the rails, and a frame supported therebetween above the rails, the compacting member including a plate structure supported on and movable with the vertically movable frame structure; and
    wherein the plate structure includes a center plate and a pair of flanges each extend obliquely downward and laterally outward from a respective lateral edge of the center plate, the center plate and the flanges all engaging the particulate matter and compacting the particulate matter so as to have a crown shape defined by the center plate and the flanges.

12. The compaction station of claim 11, wherein the compaction member includes a vibration system that causes the compaction member to vibrate at least when in contact with the particulate matter in the gondola car.

13. The compaction station of claim 11, wherein the frame further supports a second plate structure having a center plate and two obliquely downward extending lateral flanges, said second plate structure contacting the particulate matter forward relative to the gondola of the first plate structure and compressing the particulate matter to a height lower than the crown shape produced by the first plate structure.

14. The compaction station of claim 11, wherein the plate structure has a rearward portion pivotally connected with the frame, the plate structure pivoting downward in the lower position.

15. The compaction station of claim 11, wherein the compaction member is a roller.

16. The compaction station of claim 11, wherein the support structure has a spray apparatus thereon that sprays a flying-dust reduction fluid onto the particulate matter after compaction thereof.

17. The compaction station of claim 11, wherein movement of the compaction member is controlled by an electronic controller comprising a computer or a programmable logic controller.

* * * * *

UNITED STATES PATENT AND TRADEMARK OFFICE
CERTIFICATE OF CORRECTION

PATENT NO. : 8,549,997 B2  
APPLICATION NO. : 13/055456  
DATED : October 8, 2013  
INVENTOR(S) : Charles Wayne Nyquist et al.

Page 1 of 1

It is certified that error appears in the above-identified patent and that said Letters Patent is hereby corrected as shown below:

In the claims:

Column 17, line 26, claim 1,

"matter in each gondola cal;" should read --matter in each gondola car;--.

Signed and Sealed this
Third Day of December, 2013

Margaret A. Focarino
*Commissioner for Patents of the United States Patent and Trademark Office*